United States Patent
Akaike et al.

(10) Patent No.: US 8,762,995 B2
(45) Date of Patent: Jun. 24, 2014

(54) COMPUTING SYSTEM, METHOD OF CONTROLLING THE SAME, AND SYSTEM MANAGEMENT UNIT WHICH PLAN A DATA MIGRATION ACCORDING TO A COMPUTATION JOB EXECUTION SCHEDULE

(75) Inventors: Hirotoshi Akaike, Yokohama (JP); Kazuhisa Fujimoto, Koganei (JP); Shuji Nakamura, Machida (JP)

(73) Assignee: Hitachi, Ltd., Tokyo (JP)

(*) Notice: Subject to any disclaimer, the term of this patent is extended or adjusted under 35 U.S.C. 154(b) by 1474 days.

(21) Appl. No.: 12/039,289

(22) Filed: Feb. 28, 2008

(65) Prior Publication Data

US 2008/0295102 A1   Nov. 27, 2008

(30) Foreign Application Priority Data

May 24, 2007 (JP) .................. 2007-137450

(51) Int. Cl.
*G06F 12/00* (2006.01)
*G06F 3/06* (2006.01)

(52) U.S. Cl.
CPC ............ *G06F 3/0649* (2013.01); *G06F 3/0685* (2013.01)
USPC ............................ 718/102; 718/101; 711/117

(58) Field of Classification Search
None
See application file for complete search history.

(56) References Cited

U.S. PATENT DOCUMENTS

| | | | |
|---|---|---|---|
| 5,506,986 A * | 4/1996 | Healy | 711/111 |
| 5,659,743 A * | 8/1997 | Adams et al. | 1/1 |
| 5,745,756 A * | 4/1998 | Henley | 1/1 |
| 6,269,382 B1 * | 7/2001 | Cabrera et al. | 1/1 |
| 6,330,572 B1 * | 12/2001 | Sitka | 707/608 |
| 6,434,682 B1 * | 8/2002 | Ashton et al. | 711/162 |
| 7,225,211 B1 * | 5/2007 | Colgrove et al. | 707/693 |
| 7,290,168 B1 | 10/2007 | DeKoning | |
| 7,552,152 B2 * | 6/2009 | Richards et al. | 1/1 |
| 7,930,265 B2 * | 4/2011 | Akelbein et al. | 706/52 |
| 2002/0069280 A1 * | 6/2002 | Bolik et al. | 709/225 |
| 2002/0133681 A1 | 9/2002 | McBrearty et al. | |

(Continued)

FOREIGN PATENT DOCUMENTS

| | | |
|---|---|---|
| CN | 1801923 A | 7/2006 |
| CN | 1804777 A | 7/2006 |

(Continued)

OTHER PUBLICATIONS

German Office Action with English translation served Nov. 11, 2010.

(Continued)

*Primary Examiner* — Keith Vicary
(74) *Attorney, Agent, or Firm* — Brundidge & Stanger, P.C.

(57) ABSTRACT

A computing system includes a plurality of computing units, a tiered storage unit including a first storage medium and a second storage medium having a transfer rate lower than that of the first storage medium, and connected to a plurality of the computing units; and a system management unit connected to a plurality of the computing units and the tiered storage unit. The system management unit creates a computation job execution schedule for a plurality of the computing units or obtains the computation job execution schedule from other unit in the computing system, plans a data migration in the tiered storage unit according to the execution schedule using a predetermined method, and instructs the tiered storage unit to migrate a data based on the plan.

15 Claims, 22 Drawing Sheets

(56) References Cited

U.S. PATENT DOCUMENTS

| | | | |
|---|---|---|---|
| 2002/0174419 A1* | 11/2002 | Alvarez et al. | 717/168 |
| 2003/0046270 A1* | 3/2003 | Leung et al. | 707/1 |
| 2003/0140207 A1* | 7/2003 | Nagase et al. | 711/167 |
| 2004/0039891 A1* | 2/2004 | Leung et al. | 711/165 |
| 2005/0246386 A1* | 11/2005 | Sullivan et al. | 707/200 |
| 2005/0268062 A1 | 12/2005 | Nagase et al. | |
| 2006/0010169 A1* | 1/2006 | Kitamura | 707/200 |
| 2006/0010341 A1 | 1/2006 | Kodama | |
| 2006/0101084 A1* | 5/2006 | Kishi et al. | 707/200 |
| 2006/0129771 A1* | 6/2006 | Dasgupta et al. | 711/162 |
| 2006/0155950 A1 | 7/2006 | Smith | |
| 2006/0259901 A1* | 11/2006 | Kaplan | 717/168 |
| 2007/0033340 A1 | 2/2007 | Tulskie et al. | |
| 2007/0078901 A1 | 4/2007 | Satou et al. | |
| 2007/0185933 A1* | 8/2007 | Dao et al. | 707/204 |
| 2007/0198797 A1* | 8/2007 | Kavuri et al. | 711/165 |
| 2007/0255759 A1* | 11/2007 | Akelbein et al. | 707/200 |
| 2008/0154988 A1 | 6/2008 | Shiozawa et al. | |
| 2010/0274826 A1* | 10/2010 | Takata et al. | 707/812 |
| 2011/0145525 A1* | 6/2011 | Browne et al. | 711/161 |

FOREIGN PATENT DOCUMENTS

| | | |
|---|---|---|
| EP | 0 757 317 A2 | 2/1997 |
| GB | 2 449 521 A | 11/2008 |
| JP | 04266130 | 9/1992 |
| JP | 06274388 | 9/1994 |
| JP | 08272656 | 10/1996 |
| JP | 2001-022614 A | 1/2001 |
| JP | 2003-216460 | 7/2003 |
| JP | 2006-195960 | 7/2006 |
| WO | WO 2006/131978 | 12/2006 |
| WO | WO 2007/009910 A3 | 1/2007 |

OTHER PUBLICATIONS

German Office Action served Mar. 31, 2010 with English translation.
Office Action in United Kingdom Application No. GB0803851.5 mailed Jul. 6, 2010.
Japanese Office Action mailed Nov. 22, 2011 in corresponding Japanese Patent Application No. 2007-137450 with English language translation.

* cited by examiner

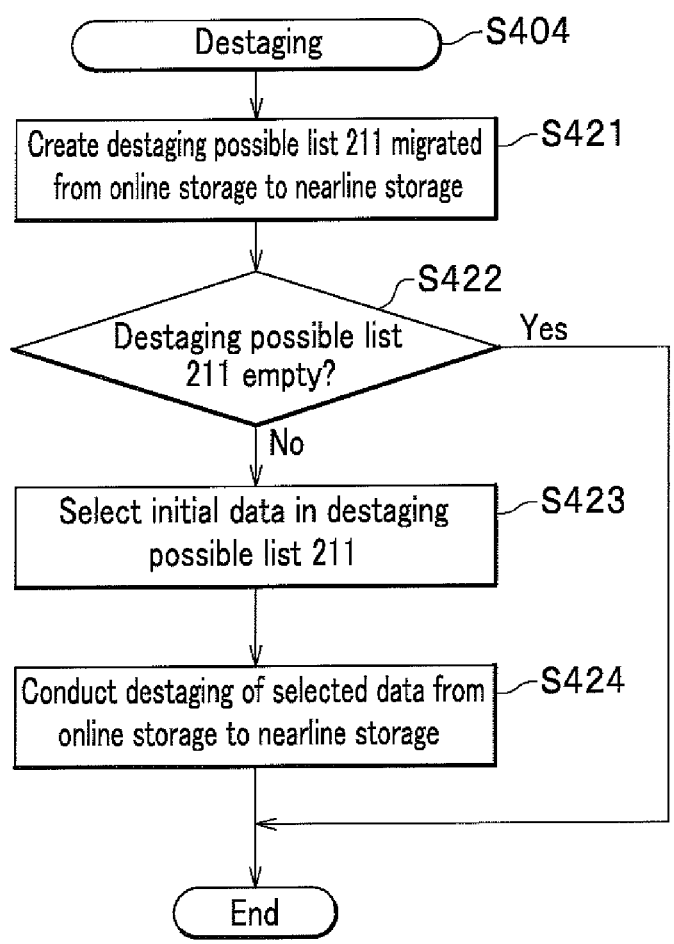

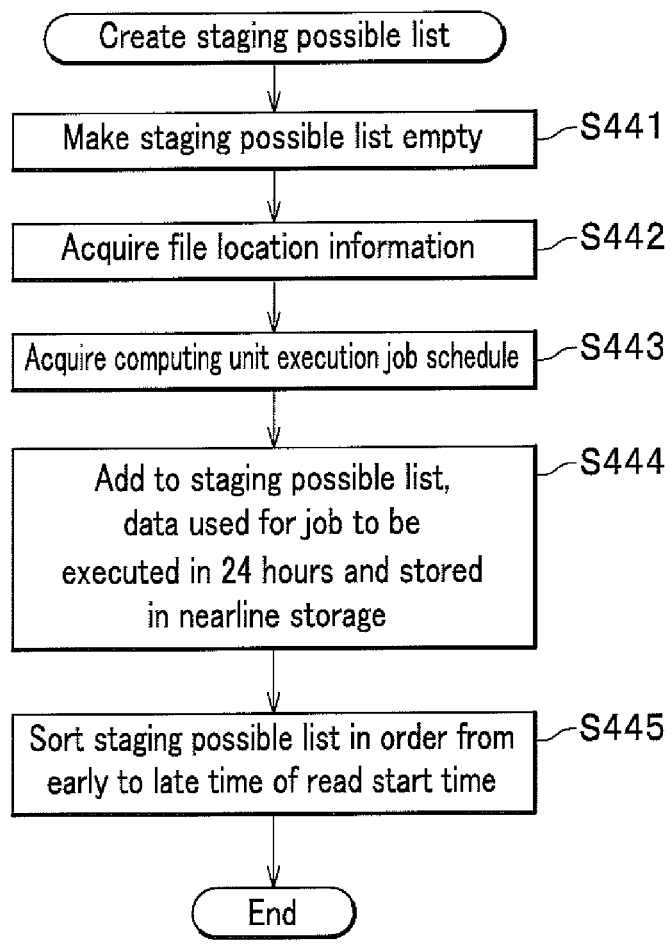

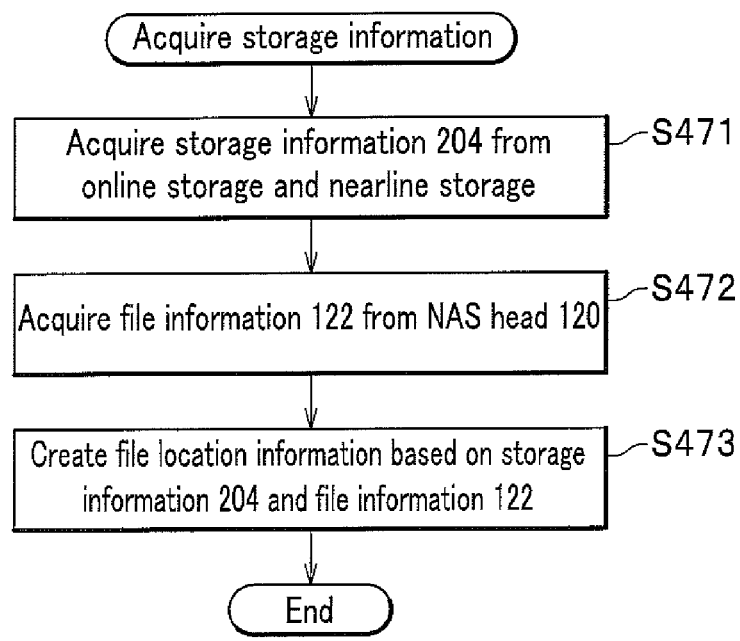

FIG.8

| Order 311 | Job name 312 | job start time 313 | Job end time 314 | Computing node 315 | Input file name 316 | Output file name 317 |
|---|---|---|---|---|---|---|
| 1 | Job 3 | 01:00 | 10:00 | 0,1 | Input_File_003 | Output_File_003 |
| 2 | Job 2 | 02:00 | 25:00 | 2,3,4,5,6 | Input_File_002 | Output_File_002 |
| 3 | Job 1 | 03:00 | 20:00 | 7 | Input_File_001 | Output_File_001 |
| 4 | Job 4 | 04:00 | 25:00 | 0 | Input_File_004 | Output_File_004 |
| ... | ... | ... | ... | ... | ... | ... |
| 51 | Job 51 | 52:00 | 60:00 | 2,3,4,5,6 | Input_File_051 | Output_File_51 |
| 52 | Job 52 | 58:00 | 68:00 | 7 | Input_File_052 | Output_File_52 |
| 53 | Job 53 | 60:00 | 70:00 | 0 | Input_File_053 | Output_File_53 |
| ... | ... | ... | | | ... | ... |
| 99 | Job 99 | 99:00 | | | Input_File_099 | Output_File_099 |

| Order | Input file name | File size | Location | Throughput | Read start time | Read end time |
|---|---|---|---|---|---|---|
| 1 | Input_File_001 | 1TB | nearline storage | 1.7GB/s | 03:00 | 03:20 |
| 2 | Input_File_002 | 2TB | online storage | 3.4GB/s | 02:00 | 02:20 |
| 3 | Input_File_003 | 1TB | nearline storage | 1.7GB/s | 01:00 | 01:20 |
| 4 | Input_File_004 | 2TB | nearline storage | 1.7GB/s | 04:00 | 04:40 |
| ... | ... | ... | ... | ... | ... | |
| 99 | Input_File_099 | 1TB | nearline storage | 1.7GB/s | 99:00 | |

FIG.11

| Order 341 | Output file name 342 | File size 343 | Location 344 | Throughput 345 | Write start time 346 | Write end time 347 |
|---|---|---|---|---|---|---|
| 1 | Output_File_001 | 1TB | online storage | 3.4GB/s | 11:50 | 20:00 |
| 2 | Output_File_002 | 2TB | online storage | 3.4GB/s | 09:40 | 10:00 |
| 3 | Output_File_003 | 1TB | online storage | 3.4GB/s | 09:50 | 10:00 |
| 4 | Output_File_004 | 2TB | online storage | 3.4GB/s | 19:40 | 20:00 |
| ... | ... | ... | ... | ... | ... | ... |
| 99 | Output_File_099 | 1TB | online storage | 3.4GB/s | 108:50 | 109:00 |

| File name 351 | LUNumber 352 | File size 353 |
|---|---|---|
| Input_File_001 | 1 | 1TB |
| Input_File_002 | 0 | 2TB |
| Input_File_003 | 1 | 1TB |
| Input_File_004 | 1 | 2TB |
| ... | ... | ... |
| Input_File_099 | 1 | 1TB |

| LU Number 361 | Storage name 362 |
|---|---|
| 0 | online storage |
| 1 | nearline storage |

| File name | Stored location | File size | Read start time |
|---|---|---|---|
| Input_File_003 | nearline storage | 1TB | 01:00 |
| Input_File_001 | nearline storage | 1TB | 03:00 |
| Input_File_004 | nearline storage | 2TB | 04:00 |
| ... | | | |

371, 372, 373, 374

↑ Priority

| File name | Stored location | File size | Read start time |
|---|---|---|---|
| Input_File_053 | online storage | 2TB | 60:00 |
| Input_File_061 | online storage | 1TB | 55:00 |
| Input_File_051 | online storage | 1TB | 52:00 |
| ... | | | |

381, 382, 383, 384

↑ Priority

COMPUTING SYSTEM, METHOD OF CONTROLLING THE SAME, AND SYSTEM MANAGEMENT UNIT WHICH PLAN A DATA MIGRATION ACCORDING TO A COMPUTATION JOB EXECUTION SCHEDULE

CROSS REFERENCE TO RELATED APPLICATIONS

This application claims the benefit of Japanese Patent Application No. 2007-137450 filed on May 24, 2007, the disclosure of which is incorporated herein by reference.

BACKGROUND OF THE INVENTION

1. Field of the Invention

The present invention relates to a computing system, a method of controlling the same, and a system management unit.

2. Description of the Related Art

Computing units for use in high-performance computing for computing weather forecast or tsunami propagation have more and more high-speed performance these years. Along with the speeded-up computing, the computing units handle a larger amount of data in the computing. Since the data for use in the high-performance computing and data resulting from the computing are stored in a storage, such a storage is required to have an extremely large capacity.

A computation in a high-speed computer is usually performed in batch processing based on a schedule or the like. When a computation is performed, three steps as follows are executed. In the first step, a data stored in a storage is transferred to a main memory of a computing unit. The step is hereinafter referred to as a staging to the computing unit. In the second step, a computation is executed using the transferred data as an input, and the outputted data is stored in the main memory. In the third step, the outputted data in the main memory is transferred to the storage and is stored therein. The step is hereinafter referred to as a destaging from the computing unit.

An increasing rate of a computing speed of a computing unit is allegedly larger than a decreasing rate of a price of a storage per unit capacity (hereinafter referred to as a bit cost). This means that a storage will cost a lot more, if a computing unit continues to have a configuration as it is, in which a data handled by the computing unit is all stored in a high-speed storage. To solve the problem, a configuration having a tiered structure of two storages is proposed. One of the two storages is a high-speed high-bit cost storage (hereinafter referred to as an online storage), and the other is a low-speed low-bit cost storage (hereinafter referred to as a nearline storage). Japanese Laid-Open Patent Application, Publication 2003-216460 (of which a US counterpart is US 2005-268062) and Japanese Laid-Open Patent Application, Publication 2006-195960 (of which a US counterpart is US 2006-0155950 A1) disclose how to control the tiered structure.

Japanese Laid-Open Patent Application, Publication 2003-216460 discloses a technique in which a data frequently accessed by a host (a computing unit) is transferred (migrated) to a storage having a high transfer rate or a high response rate. Thus an access to the data is speeded up.

Japanese Laid-Open Patent Application, Publication No. SHO 2006-195960 discloses a technique in which a threshold is established for a storage in advance, and, if a used capacity in the storage reaches or exceeds the threshold, a data is migrated to the other storage. Thus the capacity used in the storages is suitably controlled.

In the technique of Japanese Laid-Open Patent Application, Publication 2003-216460, however, an access to the data is speeded up by migrating a frequently accessed data to an online storage simply based on a frequency of the data accessed by a host, regardless of a computing schedule. This may bring about a problem as follows, if the technique is applied to a configuration of a high-speed computer. When a computing unit completes a computation and stores a resultant output data in an online storage, there may not be a sufficient free space therein, because a migration of the data is conducted regardless of the computing schedule. In this case, a destaging of the output data to a nearline storage is conducted instead, which decreases a performance of destaging the output data from the computing unit. Similarly, when an input data required for a computation is migrated from the nearline storage to the online storage, a shortage of a free space in the online storage may not allow the migration. In this case, a staging of the input data from the nearline storage to the computing unit may be conducted instead, which decreases a performance of staging the input data to the computing unit.

In the technique of Japanese Laid-Open Patent Application, Publication No. SHO 2006-195960, when a used space in an online storage reaches or exceeds a predetermined value, a certain data is migrated to a nearline storage to make a sufficient free space in the online storage. This may bring about a problem as follows, if the technique is applied to a configuration of a high-speed computer. A free space in the online storage is not used effectively due to lack of consideration of a computing schedule, which decreases a performance of a staging or a destaging.

The present invention has been made in an attempt to provide a computing system using tiered storages, capable of not decreasing a performance thereof, and having a large capacity and an excellent cost performance; a method of controlling the same; and a system management unit.

SUMMARY OF THE INVENTION

The present invention provides a computing system including a plurality of computing units, a tiered storage unit connected to a plurality of the computing units; and a system management unit connected to a plurality of the computing units and the tiered storage unit.

The tiered storage unit is configured to include a first storage medium, and a second storage medium having a transfer rate lower than that of the first storage medium.

The system management unit creates a computation job execution schedule for a plurality of the computing units or obtains the computation job execution schedule from other unit in the computing system, plans a data migration in the tiered storage unit according to the execution schedule using a predetermined method, and instructs the tiered storage unit to migrate a data based on the plan.

BRIEF DESCRIPTION OF THE DRAWINGS

FIG. 4C is a program flow of a destaging. FIG. 4E is a program flow of preparing a staging possible list. FIG. 4H is a program flow of acquiring file location information.

FIG. 8 is a block diagram showing an example of a computing unit execution job schedule according to the embodiment.

FIG. 10 is a block diagram showing an example of a staging schedule according to the embodiment.

FIG. 11 is a block diagram showing an example of a destaging schedule according to the embodiment.

FIG. 12 is a block diagram showing an example of file information according to the embodiment.

FIG. 13 is a block diagram showing an example of storage information according to the embodiment.

FIG. 14 is a block diagram showing an example of a staging possible list according to the embodiment.

FIG. 15 is a block diagram showing an example of a destaging possible list according to the embodiment.

DETAILED DESCRIPTION OF THE EXEMPLARY EMBODIMENTS

Figure 1:
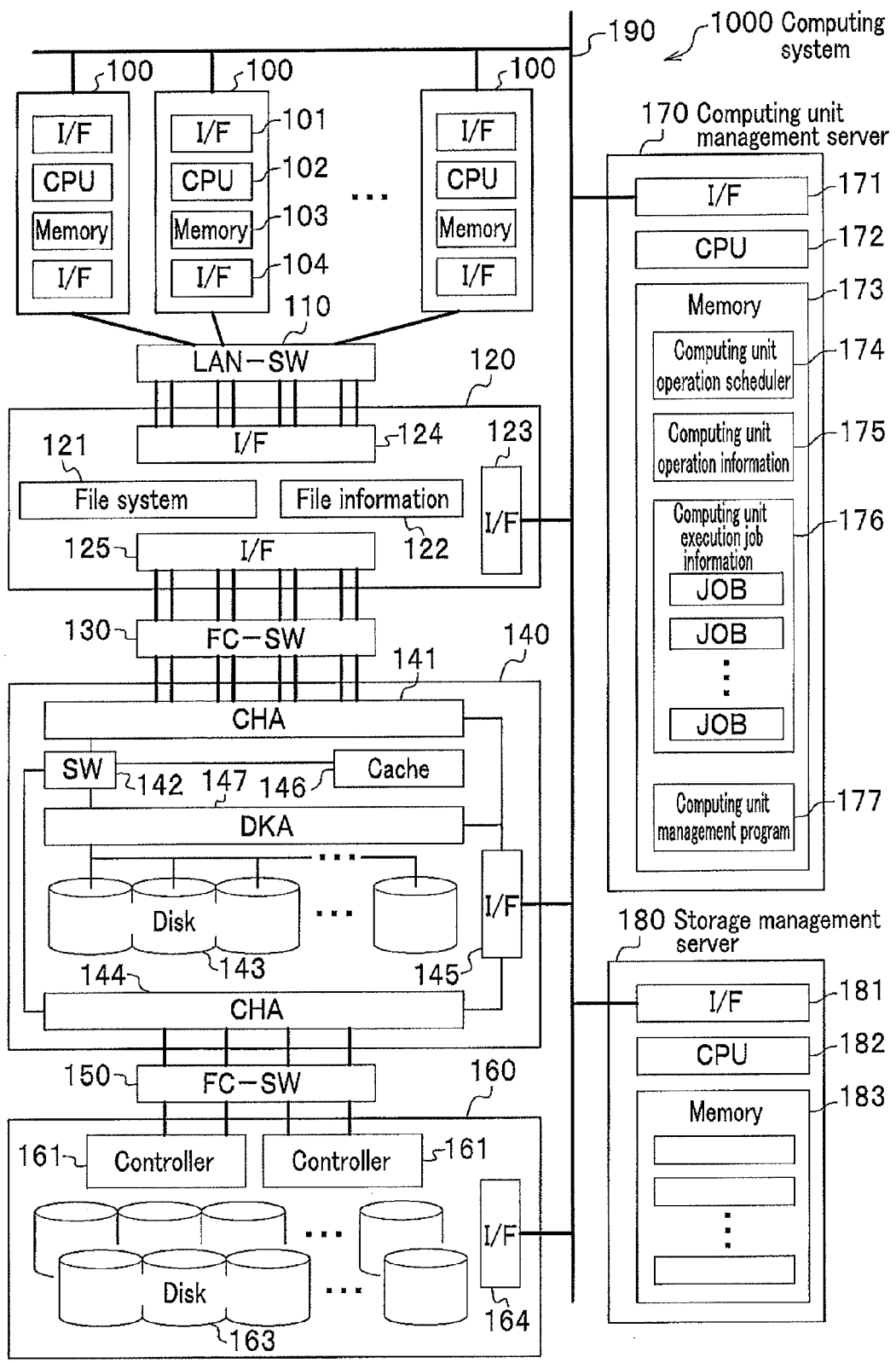
FIG. 1 is a view showing an example of a configuration of a storage system according to an embodiment of the present invention.

An exemplary embodiment of the present invention is described next in detail with reference to the related drawings.

A computing system 1000 includes a plurality of computing units 100, a NAS head 120, an online storage 140 (also referred to as a first storage medium of a tiered storage unit), a nearline storage 160 (also referred to as a second storage medium of the tiered storage unit), a computing unit management server 170, and a storage management server 180. The computing unit management server 170 and the storage management server 180 are system management units.

The computing unit 100 includes a management interface 101, a CPU (Central Processing Unit) 102, a memory 103, and a data communication interface 104. The interface 104 is connected to a LAN-SW (Local Area Network Switch) 110 as a path for data communication. An input data necessary for computation and a computed output data are transferred through the path for data communication. The interface 101 is connected to a LAN-SW 190 as a management path. The computing unit 100 receives a procedure of a computation from the computing unit management server 170 and transmits a status of the computing to the computing unit management server 170 both through the path for management. The procedure of a computation is hereinafter referred to as a job. A procedure as a content of a job is described in a form of a script (a simple program for an execution instruction) such as a job script 300 shown in FIG. 3.

A NAS head means a NAS (Network Attached Storage) not having a disk. The NAS head reads and writes a data by connecting a storage.

The NAS head 120 assigns a logical volume 0 (hereinafter referred to as LU0) to the physical online storage 140 and a logical volume 1 (hereinafter referred to as LU1) to the physical nearline storage 160. The NAS head 120 then creates a file system 121 on each of the LU0 and the LU1 and processes a file access made by the computing unit 100.

The NAS head 120 includes file information 122, which is used by the storage management server 180.

The NAS head 120 also includes a computing unit interface 124 connected to the LAN-SW 110, a storage system interface 125 connected to a FC-SW (Fibre Channel Switch) 130, and a management interface 123 connected to the LAN-SW 190.

The online storage 140 includes a CHA (Channel Adaptor) 141, a SW (Switch) 142, a plurality of disks 143, a nearline storage CHA 144, a management interface 145, a cache 146, and a DKA (DisK Adaptor) 147.

The management interface 145 is connected to the LAN-SW 190. The CHA 141 serves as an interface between a storage and an external network. The SW 142 is a switch to connect the CHA 141, the nearline storage CHA 144, the cache 146, and the DKA 147. The DKA 147 controls the disks 143 based on an IO request which the online storage 140 receives through the CHA 141. The cache 146 temporarily stores a data to be read or written in response to an IO request. The CHA 141 is connected to the FC-SW 130. The nearline storage CHA 144 is connected to the FC-SW 150.

The nearline storage 160 includes a plurality of controllers 161, a plurality of disks 163, a management interface 164, and a cache (not shown). The management interface 164 is connected to the LAN-SW 190.

The controller 161 operates similarly to the CHA 144 and DKA 147. The controller 161 controls the disks 163 in an inexpensive and compact way, which means that the controller has a lower performance than the CHA 144 and DKA 147. The controller 161 is connected to the FC-SW 150.

The computing system 1000 has a tiered structure composed of the computing unit 100, online storage 140, and nearline storage 160 from top to bottom. A staging used herein means a migration of a data from a lower tier to an upper tier in the structure. A destaging used herein means a migration of a data from an upper tier to a lower tier in the structure. The online storage 140 and the nearline storage 160 may be collectively or individually referred to as a storage system or a storage.

The computing unit management server 170 includes a management interface 171, a CPU 172, and a memory 173. The management interface 171 is connected to the LAN-SW 190.

The memory 173 stores therein a computing unit operation scheduler 174, computing unit operation information 175, computing unit execution job information 176, and a computing unit management program 177. The computing unit execution job information 176 includes a job specified by a job script 300 (see FIG. 3).

The computing unit management server 170 conducts a processing based on an instruction of the computing unit operation scheduler 174. A user describes a content of a job in a form of the job script 300 (see FIG. 3) using a computer device not shown and transmits the job script 300 to the computing unit management server 170 to make a job execution request thereto. The computing unit management server 170 conducts a following processing in response to the job execution request based on an instruction of the computing unit operation scheduler 174. The computing unit management server 170 stores the received job script 300 (see FIG. 3) in the computing unit execution job information 176 and creates a job execution schedule based on the computing unit execution job information 176. The computing unit management server 170 stores contents of the job execution schedule such as a start time and an end time for each job and a computing node as the computing unit operation information 175. A computing unit section includes one or more computing units 100. One computing unit 100 is also referred to as a computing node. Each computing node has a serial number such as 0, 1, 2, . . . as its name or identifier.

Figure 3:
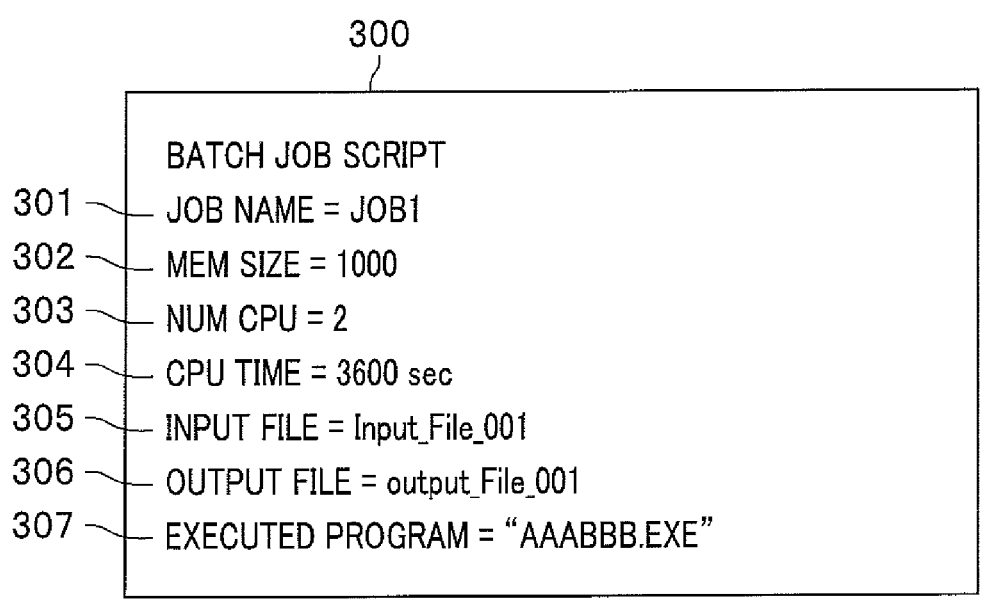
FIG. 3 is a view showing an example of a job script according to the embodiment.

The job script 300 (see FIG. 3) is stored in the computing unit execution job information 176 in the computing unit management server 170. Next is described the job script 300 with reference to FIG. 3. FIG. 3 is a view showing an example of a job script. The job script 300 includes information such as a job name 301, a memory size 302, a number of CPUs 303, a CPU time 304, an input file 305, an output file 306, and an executable file 307.

The job name 301 is a name for identifying a job and is given by a user. The memory size 302 is a size of a memory required for executing a job. The computing unit operation scheduler 174 assigns a memory in a size of the memory size 302 from the memory 103 of the computing unit 100.

The number of CPUs 303 indicates how many CPUs are required for executing a job. The computing unit operation scheduler 174 assigns CPUs with the number CPUs 303 from the CPU 102 of the computing unit 100.

The CPU time 304 is a time required for executing a job in the computing unit 100. If the time required for executing a job reaches the CPU time 304, the computing unit operation scheduler 174 ends the job.

The input file 305 is an input data of a job. When a job is executed, the computing unit 100 reads a file indicated by the input file 305 as an input file (to be hereinafter described in detail).

The output file 306 is an output data of a job. When a job is executed, the computing unit 100 writes a file indicated by the output file 306 as an output file (to be hereinafter described in detail).

A job starts at a job start time in the computing unit operation information 175 as an execution schedule of the job. A job ends at a job end time. A job is executed based on a processing of the computing unit management program 177 conducted by the computing unit management server 170. More specifically, the computing unit management server 170 instructs the computing unit 100 to conduct a computing, based on contents of the job script 300 stored in the computing unit execution job information 176. Under the instruction of the computing unit management server 170, the computing unit 100 usually conducts three processings, based on the input file 305, the executable file 307, and the output file 306 described in the job script 300 from the storage system to the computing unit 100. The three processings are a staging of an input file from a storage system to the memory 103 of the computing unit 100, an execution of an executable file, and a destaging of an output file from the memory 103 of the computing unit 100 to the storage system.

There are two methods of a staging and a destaging between the computing unit 100 and a storage system. One is a staging and a destaging between the computing unit 100 and the online storage 140. The other is a staging and a destaging between the computing unit 100 and the nearline storage 160. The two methods are compared below in terms of a time required for a staging and a destaging.

Figure 7A:
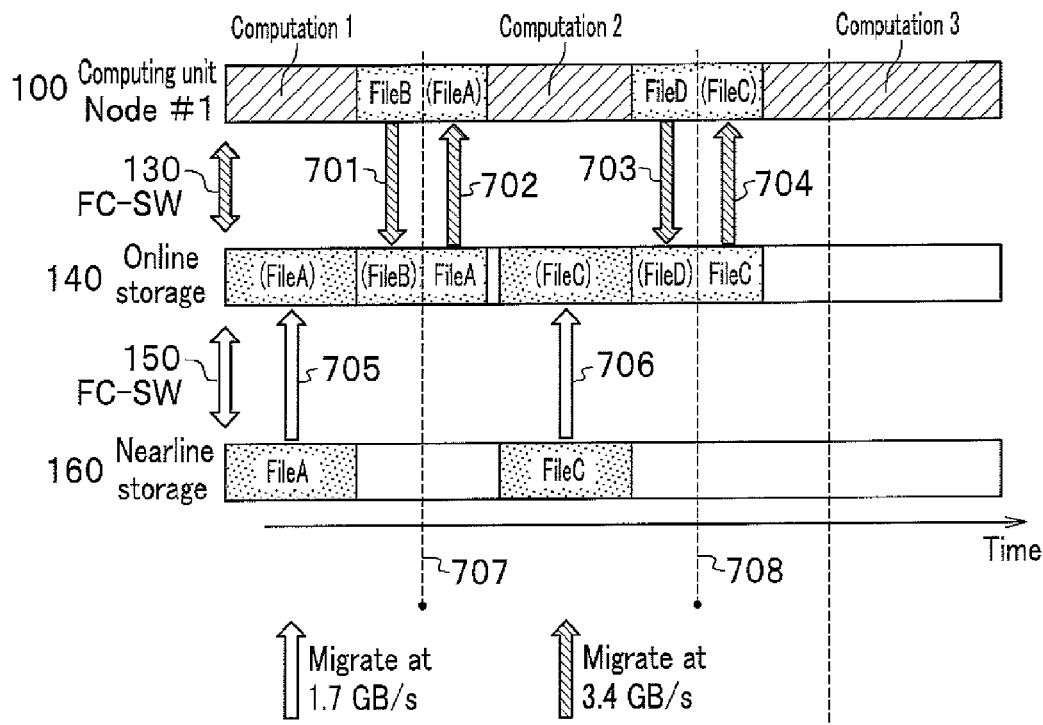
FIG. 7A is a view for explaining a staging and a destaging using a migration between a computing unit and an online storage according to the embodiment.

FIG. 7A shows a staging and a destaging between the online storage 140 and the computing unit 100 in a series of computations conducted by the computing unit 100, using a data migration. Reference numerals 707, 708 each indicate a start time of a job. Reference numerals 701, 703 each indicate a destaging of an output file from the computing unit 100 to the online storage 140. The destaging indicated by the reference numerals 701, 703 is conducted via the FC-SW 130 between the computing unit 100 and the online storage 140 at a throughput of 3.4 GB/s. Reference numerals 702, 704 each indicate a staging of an input file from the online storage 140 to the computing unit 100. The staging is conducted at a throughput of 3.4 GB/s. Reference numerals 705, 706 each indicate a staging of an input file required for a computation to the online storage 140 in advance. The staging is conducted at a throughput of 1.7 GB/s. At a start of the job at the start time 707, an input file File A used for a computation 2 is staged as indicated by the reference numeral 702.

Prior to the staging 702, the staging 705 of the File A is conducted from the nearline storage 160 to the online storage 140. Thus, the staging 702 of the File A from the online storage 140 to the computing unit 100 starts at the job start time 707.

Figure 7B:
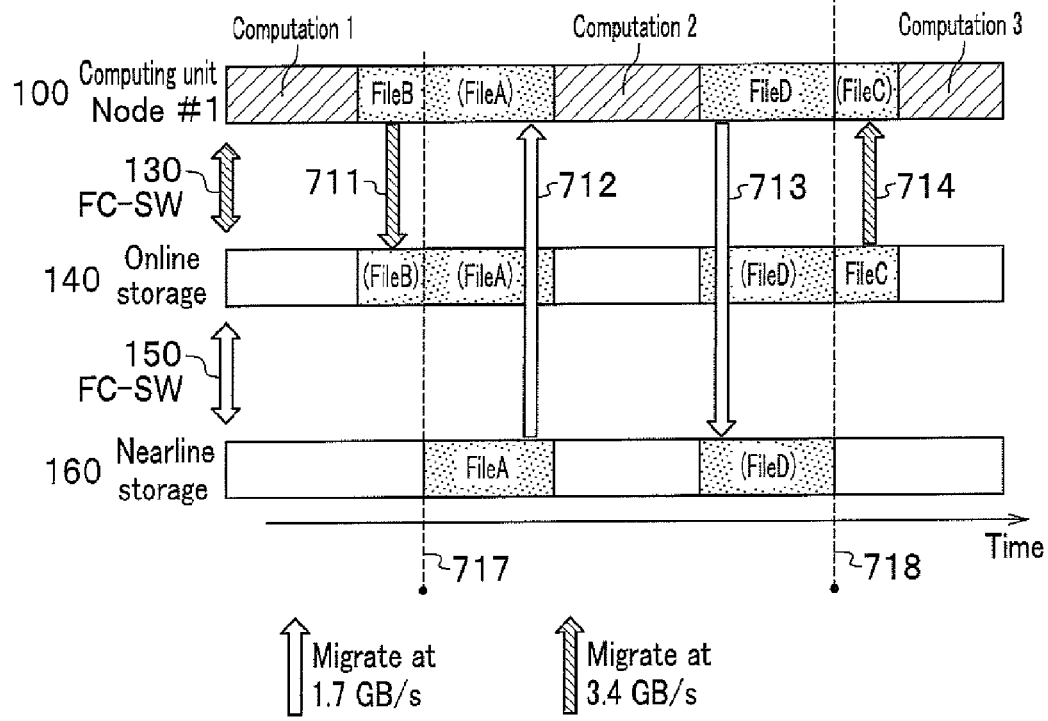
FIG. 7B is a view for explaining a staging and a destaging using a migration between a computing unit and a nearline storage.

FIG. 7B shows a staging and a destaging between the nearline storage 160 and the computing unit 100 via the online storage 140 in a series of computations conducted by the computing unit 100, using a data migration.

Reference numerals 717, 718 each indicate a start time of a job. A reference numeral 712 indicates a staging of an input file from the nearline storage 160 to the computing unit 100. The staging is conducted at a throughput of 1.7 GB/s, which is in accordance with the throughput from the nearline storage 160 to the online storage 140. A reference numeral 713 indicates a destaging of an output file from the computing unit 100 to the nearline storage 160. Similarly, the destaging is conducted at a throughput of 1.7 GB/s. Reference numerals 711, 714 indicate same as the destaging 701 and the staging 704, respectively.

In both FIG. 7A and FIG. 7B, the stagings of the File A are executed at the same start times 707, 717, respectively. However, in FIG. 7A, the staging is conducted from the online storage 140 at the high-speed throughput 3.4 GB/s, and in FIG. 7B, the staging is conducted from the nearline storage 160 at the low-speed throughput 1.7 GB/s. In destagings, a speed thereof shown in FIG. 7A is faster than that shown in FIG. 7B. That is, it takes less time for the stagings and destagings in the method of FIG. 1 than that of FIG. 2.

As a result, the method of FIG. 7A in which a required file is migrated in advance to the online storage 140 is advantageous in that the computing unit 100 can spend more time in a computing than the method of FIG. 7B, because the stagings and destagings take less time. The storage management server 180 may migrate a required file in advance from the nearline storage 160 to the online storage 140 with the method of FIG. 7A. This makes the computing unit 100 conduct a staging/destaging always between the online storage 140 and itself. In an ideal state, the computing unit 100 can make use of an entire free space of the storage system combined with the online storage 140 and the nearline storage 160 for conducting a staging/destaging at a high-speed throughput of the online storage 140.

However, if a free space left in the online storage 140 is small, the computing unit 100 cannot conduct a staging/destaging between itself and the online storage 140. This causes two problems as follows.

One problem is that an input file required for a computation may not always be migrated to the high-speed online storage 140 when necessary. If a staging of the input file is conducted not from the online storage 140 but from the nearline storage 160 to the computing unit 100, a staging performance is decreased.

The other problem is that a destaging of an output file from the computing unit 100 may not always be conducted to a free space of the online storage 140. In this case, a destaging of the output file is conducted not to the online storage 140 but to the nearline storage 160. This decreases a destaging performance.

To solve the problems, it is necessary to control a free space of the online storage 140.

Just a simple approach in which, when a free space of the online storage 140 gets smaller, a file is migrated to the nearline storage 160 cannot solve the problems. The reason is explained next.

Figure 6A:
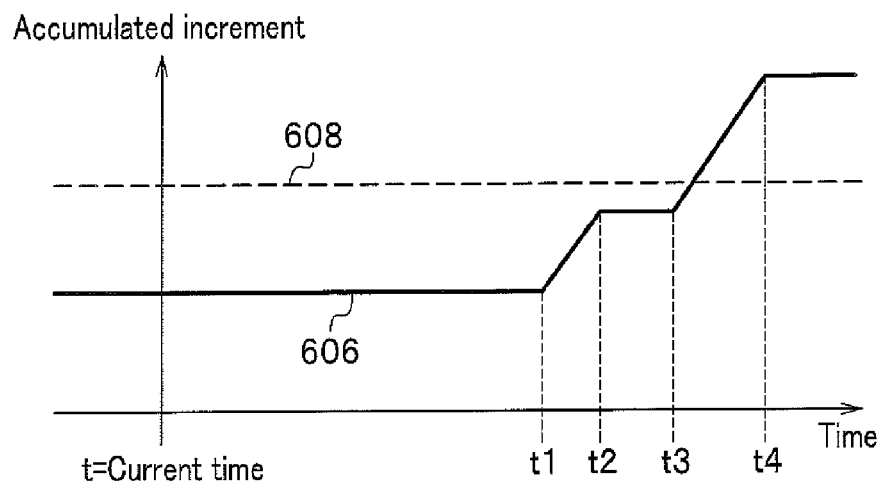
FIG. 6A to FIG. 6C are views showing another operations of a staging and a destaging according to the embodiment.
Figure 6B:
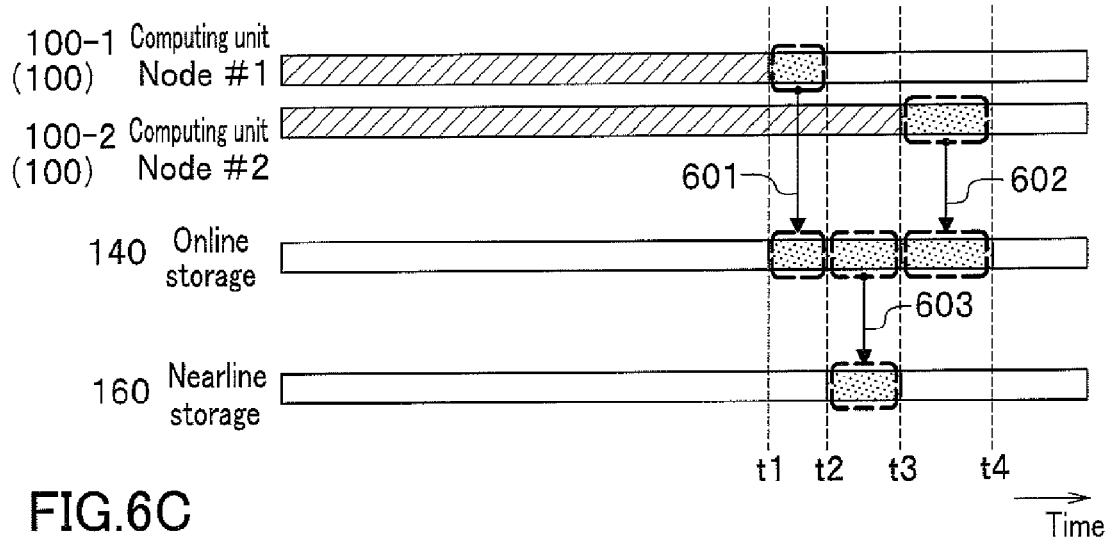
Figure 6C:
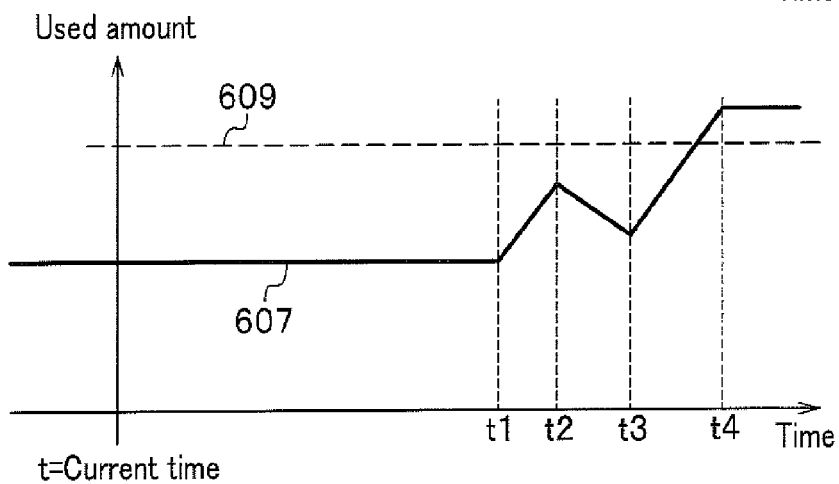

FIG. 6A to FIG. 6C are views for explaining an example in which, even if the online storage 140 still has a free space, an output from the computing unit 100 brings about a shortage of the free space by lapse of time.

In FIG. 6A, a polygonal line 606 indicates an accumulated increment (a sum of increments) calculated by adding a data stored in the online storage 140 after being outputted from the computing unit 100, to a current used space of the online storage 140 used by the online storage 140. A dashed line 608 indicates a maximum space of the online storage 140. The computing unit 100 conducts a computation of a job from a current time to a time t1.

At the time t1, a destaging 601 of an output data is started from a computing unit 100-1 (a first computing unit 100 of a plurality of the computing units), and is then ended at a time t2. By lapse of time, a shortage of the free space of the online storage 140 is brought about. At the time t2, a destaging 603 for migrating a data in the online storage 140 to the nearline storage 160 is started to increase the free space of the online storage 140 (see FIG. 6B). After that, a computing unit 100-2 (a second computing unit of a plurality of the computing units 100) executes the job until a time t3. At the time t3, a destaging 602 of the output data is started from the computing unit 100-2 and is ended at a time t4. However, the free space in the online storage 140 has been exhausted during the destaging 602. In FIG. 6C, a polygonal line 607 indicates a space used by the online storage 140. A dashed line 609 indicates a maximum space of the online storage 140, like the dashed line 608. The polygonal line 607 represents that the space used has reached the maximum space indicated by the dashed line 609 during the destaging 602, at which the free space of the online storage 140 is exhausted.

Thus, the simple approach described above cannot keep the space used by the online storage 140 within the maximum space thereof, even though the destaging 603 is conducted, because the destaging 603 starts too late.

A shortage of the free space in the online storage 140 results from an unknown amount of a data outputted from the computing unit 100 and a higher throughput outputted therefrom than a throughput migrated to the nearline storage 160. In other words, depending on an amount of a data outputted from the computing unit 100, if a destaging is conducted to ensure the free space by migrating the data to the nearline storage 160, the free space of the online storage 140 may be exhausted before the migration is completed, because the throughput of the computing unit 100 is higher than that of the migration.

The simple approach is based on the free space in the online storage 140, but not on an amount of a data to be outputted from the computing unit 100 as a result of a computing. Whether or not the free space in the online storage 140 is sufficient is not known when the data is outputted.

To solve such a problem, the present invention provides a method of estimating a data amount used by the online storage 140, to thereby control the free space thereof. In the method, a destaging of a file in a destaging possible list 211 is conducted in advance according to online storage usage estimate information 209 (see FIG. 2).

The destaging allows the free space to be suitably increased in advance. Details of the destaging are described later.

In the method of the present invention, instead of the free space, an index is introduced which is based on a current free space and an amount of a data to be outputted from the computing unit 100. The index is hereinafter referred to as an available space. The available space is stored in the online storage usage estimate information 209 (see FIG. 2).

The available space is used to control the free space of the online storage 140 as follows. If the available space still remains, a staging of an input data of a compution is conducted from the nearline storage 160 to the online storage 140.

If the available space is not left, a destaging of the same is conducted from the online storage 140 to the nearline storage 160. Further details of the available space are described later.

Figure 5A:
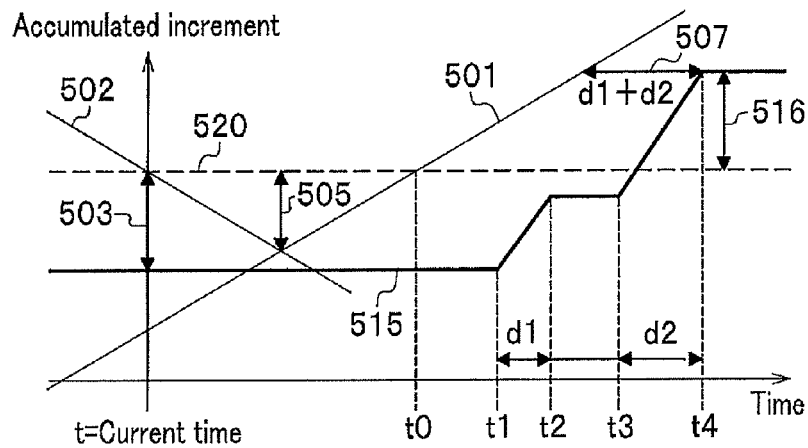
FIG. 5A to FIG. 5C are views for explaining operations of a staging and a destaging according to the embodiment.
Figure 5B:
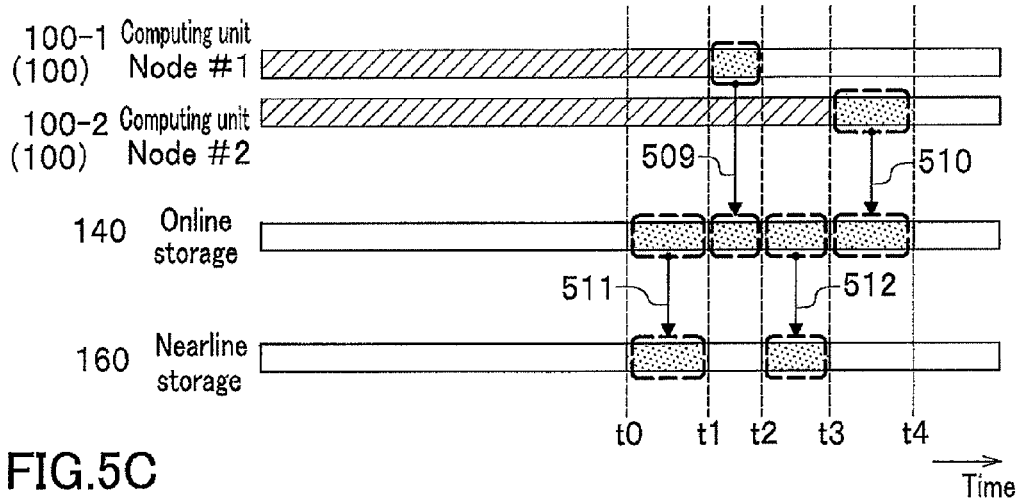
Figure 5C:
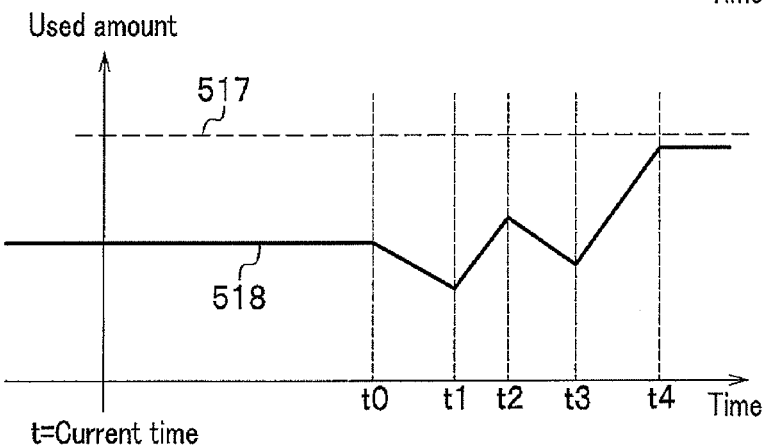

FIG. 5A to FIG. 5C are views for explaining operations of a staging and a destaging.

In FIG. 5A, a polygonal line 515 indicates an accumulated increment calculated by adding an amount of a data to be stored in the online storage 140 after outputted from the computing unit 100, to a current used space in the online storage 140. A dashed line 520 indicates a maximum space of the online storage 140. The computing unit 100-1 conducts a computation of a job from a current time to the time t1.

In FIG. 5B, a destaging 509 of an output data is started at the time t1 and is ended at the time t2. After that, the computing unit 100-2 executes a computation of a job until the time t3. At the time t3, a destaging 510 of the output data is started from the computing unit 100-2 and is ended at a time t4.

The destaging of the output data causes an excess of the accumulated increment in the online storage 140 over its maximum space. The excess is referred to as an excess used space 516.

A reference numeral 507 indicates a total time of a lapse time d1 from t1 to t2 and a lapse time d2 from t3 to t4, that is, a total time required for a destaging from the computing unit 100 until the time t4. The total time is used in Expression 5 to be hereinafter described.

A solid line 501 has a slope corresponding to a throughput between the nearline storage 160 and the online storage 140. The solid line 501 passes through a point where a point on the polygonal line 515 at the time t4 is shifted leftward by a distance corresponding to the total time 507.

A solid line 502 has a negative slope corresponding to a throughput between the nearline storage 160 and the online storage 140 and passes through an origin (a point on a dashed line 520 at a current time). A distance between an intersection between the solid lines 501, 502 and the dashed line 520, which indicates the maximum space of the online storage 140, indicates an available space 505. The available space 505 is determined whether or not to satisfy "[Available space 505]>0 (Expression 1)".

If Expression 1 is satisfied, the free space is still left in the online storage 140, and a staging can be conducted.

If Expression 1 is not satisfied, the free space is not sufficiently left in the online storage 140. In this case, a destaging is conducted from the online storage 140 to the nearline storage 160 to create more free space in the online storage 140.

The solid lines 501 and the dashed line 520 intersect at a time t0 at which the available space 505 is null. At the time t0, a destaging 511 from the online storage 140 to the nearline storage 160 is started. A reference numeral 503 indicates a current free space.

In FIG. 5C, a dashed line 517 indicates the maximum space of the online storage 140, like the dashed line 520. The destaging 509 of the output data from the computing unit 100-1 is conducted from the time t1 to the time t2. Thus, a destaging from the online storage 140 to the nearline storage 160 is not conducted. This is because the storage management server 180 prevents a migration using either of the storage mediums which is being accessed by the computing unit 100, so as not to decrease a throughput of a staging and a destaging between the computing unit 100-1 and the storage system. At the time t2, the destaging 509 of the output data from the computing unit 100-1 is ended, and a destaging 512 from the online storage 140 to the nearline storage 160 is started, because the available space 505 is null.

The polygonal line 518 in FIG. 5C indicates a used space in the online storage 140. The polygonal line 518 represents that, according to the method of the present invention, the used space in the online storage 140 is kept within the maximum space even when the data outputted from the computing unit 100 is received.

The operations shown in FIG. 5C are carried out by the storage management server 180.

The storage management server 180 shown in FIG. 1 includes a management interface 181, a CPU 182, and a memory 183. The management interface 181 is connected to the LAN-SW 190.

Figure 2:
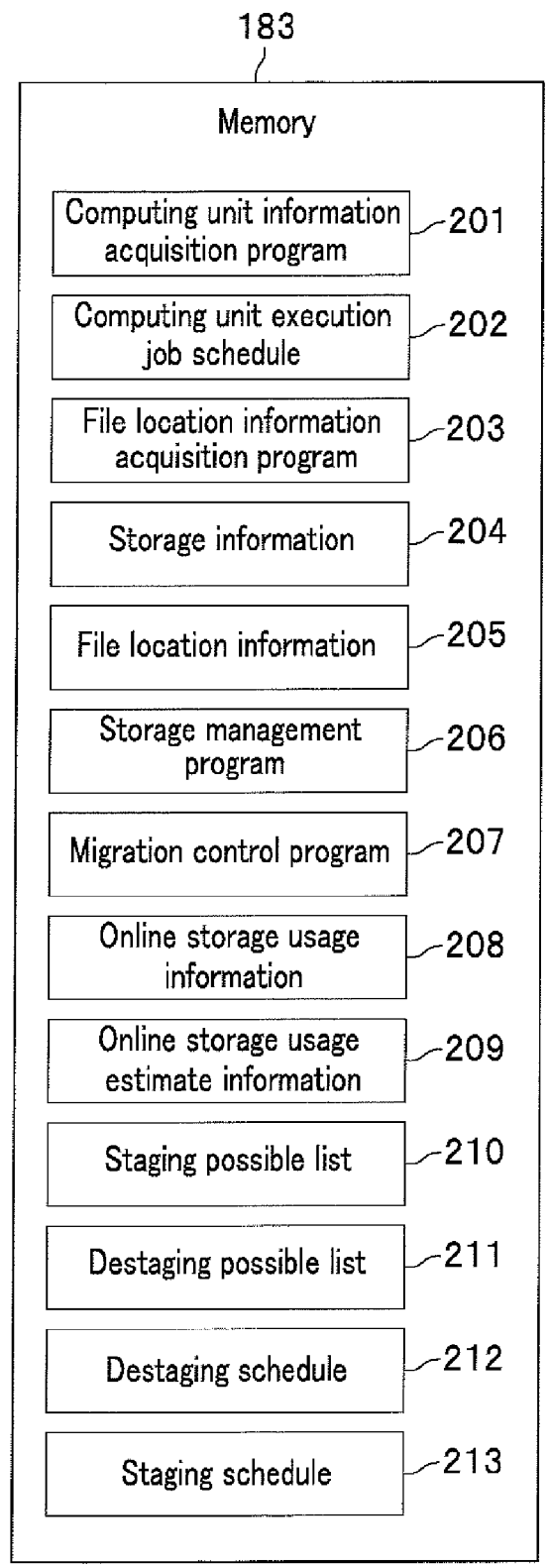
FIG. 2 is a view showing contents of a memory in a storage management server according to the embodiment.

FIG. 2 is a block diagram showing contents of program information stored in the memory 183 of the storage management server 180.

The memory 183 includes a computing unit information acquisition program 201, a computing unit execution job schedule (a computation job execution schedule) 202, a file location information acquisition program 203, storage information 204, file location information 205, a storage management program 206, a migration control program 207, online storage usage information 208, online storage usage estimate information 209, a staging possible list 210, a destaging possible list 211, a destaging schedule (a write schedule) 212, and a staging schedule (a read schedule) 213.

The storage management server 180 acquires the computing unit operation information 175 and the computing unit execution job information 176 in the computing unit management server 170, based on the computing unit information acquisition program 201, to thereby create the computing unit execution job schedule 202. FIG. 8 is a block diagram showing the computing unit execution job schedule 202. The computing unit execution job schedule 202 includes an order 311, a job name 312, a job start time 313, a job end time 314, a computing node 315, an input file name 316, and an output file name 317. The computing unit execution job schedule 202 is constituted by adding, to information of an input-output file written in the job script 300 (see FIG. 3) for each job, the job start time 313, the job end time 314, and the computing node 315 for each job of the computing unit execution job information 176. The computing unit execution job schedule 202 is used for creating the staging possible list 210, the destaging possible list 211, the destaging schedule 212, and the staging schedule 213.

The storage management server 180 also acquires the storage information 204 and the file information 122 based on the file location information acquisition program 203, to thereby create the file location information 205.

The storage information 204 is used for associating the LU managed by the NAS head 120 in the file system 121, with the physical storage system. As shown in FIG. 13, the storage information 204 includes a LU Number 361 and a storage name 362 associated therewith.

As shown in FIG. 12, the file information 122 includes a file name 351, a LU Number 352, and a file size 353.

The LU Number 352 and the file size 353 are a logical unit and a size of a file indicated by the file name 351, respectively.

Figure 9:
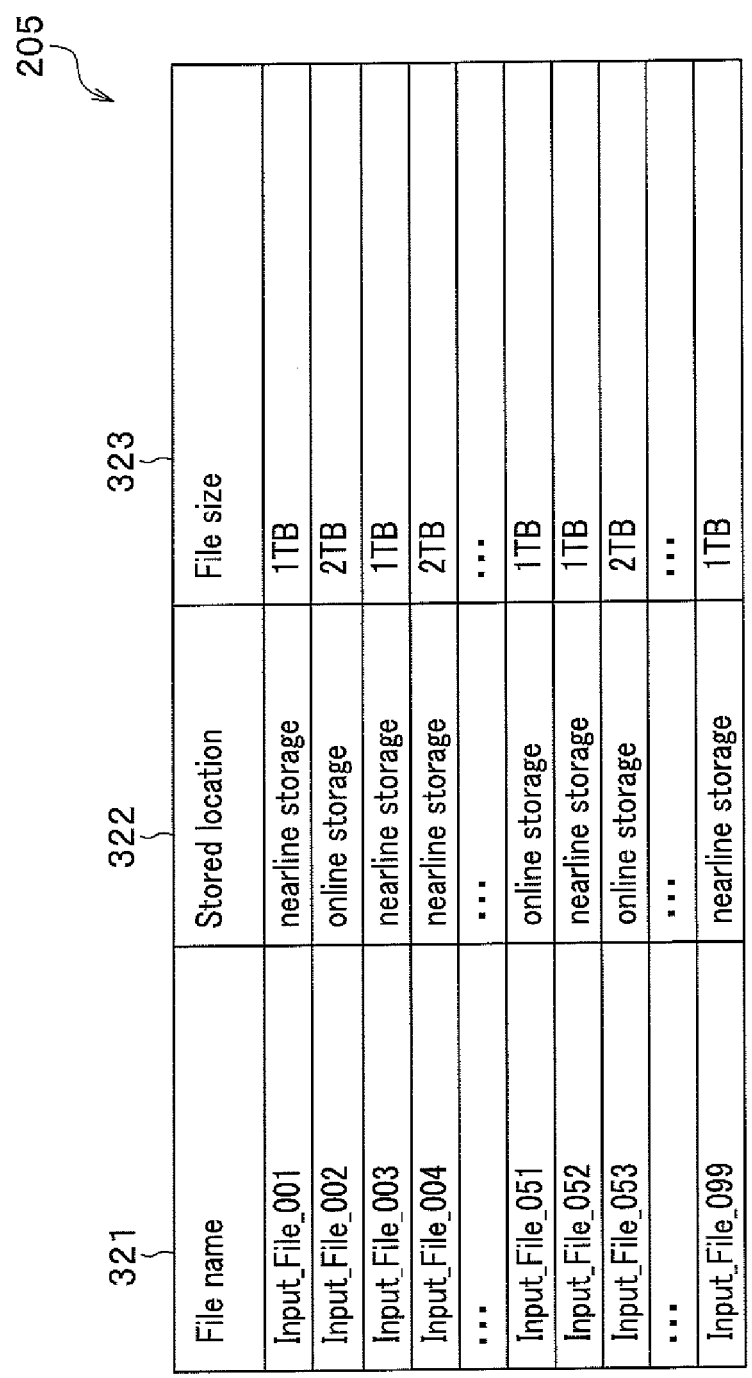
FIG. 9 is a block diagram showing an example of file location information according to the embodiment.

As shown in FIG. 9, the file location information 205 includes a file name 321, a stored location 322, and a file size 323. The stored location 322 indicates whether a file identified by the file name 321 is stored in the online storage 140 or in the nearline storage 160. The file size 323 indicates a size of a file identified by the file name 321. The file location information 205 is used for creating the staging possible list 210, the destaging possible list 211, the destaging schedule 212, and the staging schedule 213.

The storage management server 180 creates the staging schedule 213 and the destaging schedule 212, based on a processing of the migration control program 207, using the computing unit execution job schedule 202 and the file location information 205.

The staging schedule 213 is a schedule in which an input file used in a job is read by the computing unit 100 from the computing unit execution job schedule 202 with a planned computation schedule stored therein.

As shown in FIG. 10, the staging schedule 213 includes an order 331, an input file name 332, a file size 333, a location 334, a throughput 335, a read start time 336, and a read end time 337.

The file size 333 indicates a size of a file identified by the input file name 332. The location 334 indicates whether a file identified by the input file name 332 is stored in the online storage 140 or in the nearline storage 160. The throughput 335 indicates a throughput of a storage at the location 334. The read start time 336 and the read end time 337 are times at which the computing unit 100 starts and ends, respectively, a read of a file identified by the input file name 332.

The destaging schedule 212 is a schedule in which an output file used in a job is written by the computing unit 100 from the computing unit execution job schedule 202 with a planned computing schedule stored therein.

As shown in FIG. 11, the destaging schedule 212 includes an order 341, an output file name 342, a file size 343, a location 344, a throughput 345, a write start time 346, and a write end time 347.

The file size 343 indicates a size of a file identified by the output file name 342. The location 344 indicates whether a file identified by the output file name 342 is stored in the online storage 140 or in the nearline storage 160. The throughput 345 indicates a throughput of a storage at the location 344. The write start time 346 and the write end time 347 are times at which the computing unit 100 starts and ends, respectively, a write of a file identified by the output file name 342.

The storage management server 180 creates the online storage usage estimate information 209, the staging possible list 210, and the destaging possible list 211, based on a processing of the migration control program 207, using the computing unit execution job schedule 202, online storage usage information 208, file location information 205, staging schedule 213, and destaging schedule 212.

The online storage usage estimate information 209 stores therein an available space. The available space is an estimated free space in the online storage 140, based on an amount of a data to be outputted by the computing unit 100 and an amount of a destaging to the nearline storage 160.

As shown in FIG. 14, the staging possible list 210 includes a file name 371, a stored location 372, a file size 373, and a read start time 374 which is a time accessed by a job.

The stored location 372 indicates whether a file identified by the file name 371 is stored in the online storage 140 or in the nearline storage 160. The file size 373 indicates a size of a file identified by the file name 371. The read start time 374 is a time at which the computing unit 100 starts a read of a file identified by the file name 371. The staging possible list 210 is used for determining a file to be staged, which is described later.

As shown in FIG. 15, the destaging possible list 211 includes a file name 381, a stored location 382, a file size 383, and a read start time 384 which is a time accessed by a job.

The stored location 382 indicates whether a file identified by the file name 381 is stored in the online storage 140 or in the nearline storage 160. The file size 383 indicates a size of a file identified by the file name 381. The read start time 384 is a time at which the computing unit 100 starts a read of a file identified by the input file name 381. The destaging possible list 211 is used for determining a file to be destaged, which is described later.

The storage management server 180 determines whether or not a staging and/or a destaging is necessary, based on the migration control program 207 according to the online storage usage estimate information 209, and selects one migration possible file from the staging possible list 210 and/or the destaging possible list 211. A method of the selection is described later.

If the storage management server 180 determines that a staging is to be conducted, the storage management server 180 stages a file selected from the staging possible list 210, from the nearline storage 160 to the online storage 140, based on the storage management program 206. That is, the storage management server 180 instructs the NAS head 120 to migrate the selected file from the LU1 to the LU0.

If storage management server 180 determines that a destaging is necessary, the storage management server 180 destages a file selected from the destaging possible list 211, from the online storage 140 to the nearline storage 160, based on the storage management program 206. That is the storage management server 180 instructs the NAS head 120 to migrate the selected file from the LU0 to the LU1.

The storage management server 180 determines whether or not a staging is necessary for storing an input file required for a computation in the online storage 140, based on the migration control program 207. If the storage management server 180 determines that the staging is necessary, the storage management server 180 conducts the staging, based on the storage management program 206.

With the operations described above, an input file required for a computation can be migrated to the high-speed online storage 140 when necessary. A staging of the input file to the computing unit 100 can be conducted in a short time. A destaging of an output file from the computing unit 100 to a free space in the online storage 140 can also be ensured. The destaging of the output file can be conducted in a short time.

Figure 4A:
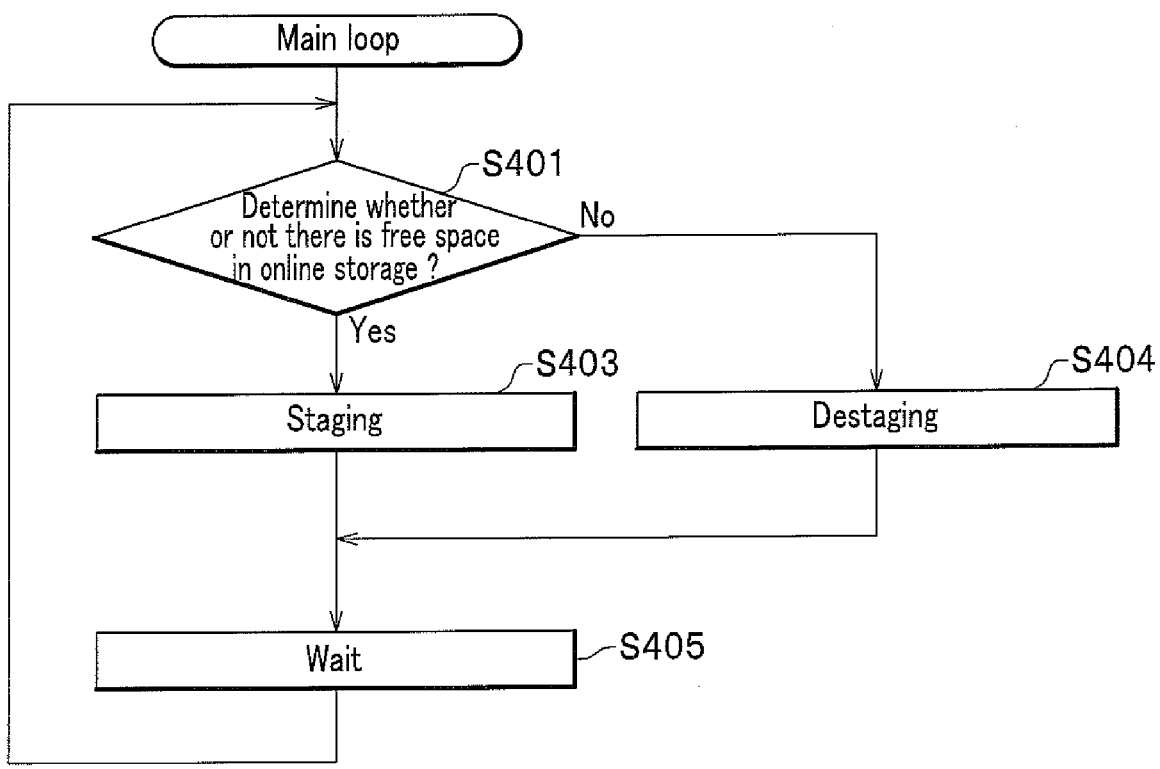
FIG. 4A is a program flow of a main loop in a method according to the embodiment.

FIG. 4A is a flowchart showing a flow of a processing conducted by the storage management server 180 and based on the migration control program 207. The processing is a main program flow (a main loop) of the method according to the present invention. Note that processings shown in respective flowcharts of FIG. 4A to FIG. 4H are executed, for example, when the CPU 182 of the storage management server 180 references information in the memory 183.

In FIG. 4A, the storage management server 180 determines whether or not there is a sufficient free space in the online storage 140 (Step S401).

If the storage management server 180 determines that there is a free space in the online storage 140 (Yes in Step S401), the storage management server 180 conducts a staging (Step S403).

If the storage management server 180 determines that there is not a free space in the online storage 140 (No in Step S401), the storage management server 180 conducts a destaging (Step S404).

After that, the storage management server 180 waits for a predetermined time period (Step S405), and then the processing returns to Step S401.

Figure 4B:
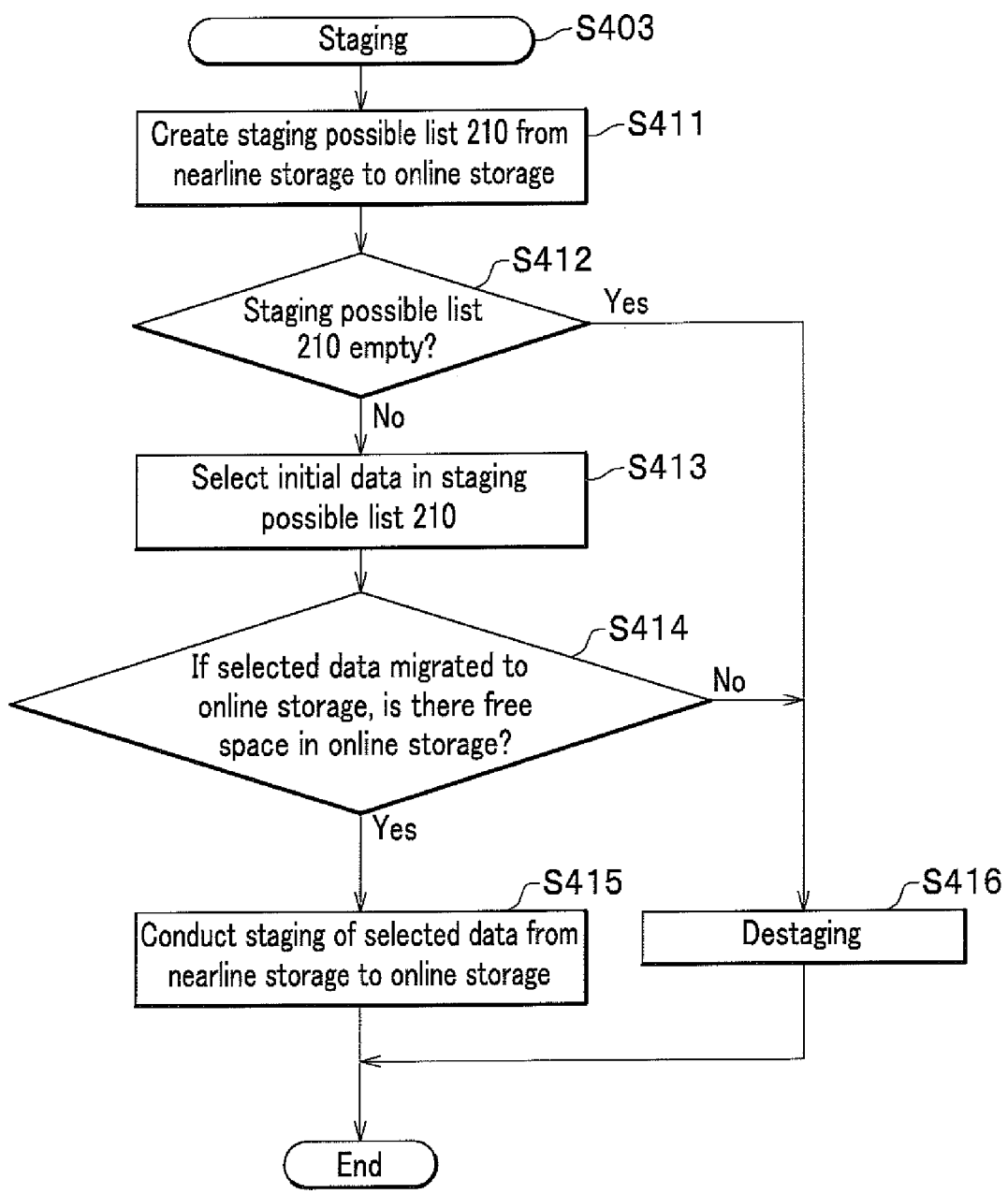
FIG. 4B is a program flow of a staging.

Next is described a flow of a staging conducted by the storage management server 180 and based on the migration control program 207, which corresponds to Step S403 in FIG. 4A, with reference to FIG. 4B.

In Step S411, the storage management server 180 creates a staging possible list 210, which is a list of files possible to be staged.

In Step S412, the storage management server 180 determines whether or not the created staging possible list 210 is empty.

If the staging possible list 210 is determined to be empty (Yes in Step S412), the storage management server 180 executes a destaging (Step S416).

If the staging possible list 210 is not determined to be empty (No in Step S412), the storage management server 180 selects an initial data in the staging possible list 210 (Step S413).

In Step S414, the storage management server 180 determines whether or not there is a sufficient free space left in the online storage 140 if the selected data is migrated to the online storage 140.

If it is determined that there is not a sufficient free space (No in Step S414), the storage management server 180 conducts a destaging (Step S416).

If it is determined that there is a sufficient free space left (Yes in Step S414), the storage management server 180 conducts a staging of the selected data from the nearline storage 160 to the online storage 140, based on the storage management program 206 (Step S415). If a staging to the computing unit 100 or a destaging from the computing unit 100 is started during Step S415, the staging in Step S415 is temporarily suspended. The suspension of the staging in Step S415 allows the computing unit 100 to execute a staging or a destaging with a maximum performance of the online storage 140.

Next is described a flow of a destaging conducted by the storage management server 180 and based on the migration control program 207, which corresponds to Step S404 in FIG. 4A, with reference to FIG. 4C.

In Step S421, the storage management server storage creates a destaging possible list 211, which is a list of files possible to be destaged.

In Step S422, the storage management server 180 determines whether or not the created destaging possible list 211 is empty.

If the destaging possible list 211 is determined to be empty (Yes in Step S422), the storage management server 180 terminates the processing.

If the destaging possible list 211 is not determined to be empty (No in Step S422), the storage management server 180 selects an initial data in the staging possible list 211 (Step S423).

In Step S424, the storage management server 180 conducts a destaging of the selected data from the online storage 140 to the nearline storage 160, based on the storage management program 206. If a staging to the computing unit 100 or a destaging from the computing unit 100 is started during Step S424, the destaging in Step S424 is temporarily suspended. The suspension of the staging in Step S424 allows the computing unit 100 to execute a staging or a destaging with a maximum performance of the online storage 140.

Next is described a flow of a processing of creating the staging possible list 210 conducted by the storage management server 180 and based on the migration control program 207, with reference to FIG. 4E.

In Step S441, the storage management server 180 initializes the staging possible list 210 to empty the same.

In Step S442, the storage management server 180 acquires the file location information 205 based on the file location information acquisition program 203.

In Step S443, the storage management server 180 acquires the computing unit execution job schedule 202 based on the computing unit information acquisition program 201.

In Step S444, the storage management server 180 selects a job to be executed in 24 hours (or a predetermined time period) from the computing unit execution job schedule 202. A time period of "24 hours" in this case is a reference time for conducting a staging and is hereinafter referred to as a staging reference time. The storage management server 180 retrieves a location of an input file corresponding to the selected job from the file location information 205. If the location of the input file is in the nearline storage 160, the storage management server 180 adds the job to the staging possible list 210.

When the storage management server 180 adds the job to the staging possible list 210, the storage management server 180 writes the input file 316 of the job selected from the computing unit execution job schedule 202 (see FIG. 8), the job start time 313 thereof, the stored location 322 of a file name corresponding to the input file name 316 from the file location information 205 (see FIG. 9), and the file size thereof, into the file name 371 in the staging possible list 210 (see FIG. 14), the read start time 374 therein, the stored location 372 therein, and the file size 373 therein, respectively.

A job having a start time within 24 hours becomes a possible candidate for staging in order to migrate in advance an input file of the job to be executed to the online storage 140.

The staging reference time is herein 24 hours, but may be changed according to how the computing unit 100 is used. For example, a job scheduler can create a schedule even more than 20 hours ahead, and an actual schedule may be changed later. In this case, the job scheduler may be set to collect a job having a start time within 20 hours.

In Step S445, the storage management server 180 sorts the staging possible list 210 in an order from early to late read start time 374. The staging possible list 210 may be sorted in any other order such as a file size and a priority specified or set by a user (a data amount, a transfer rate, or the like).

Figure 4D:
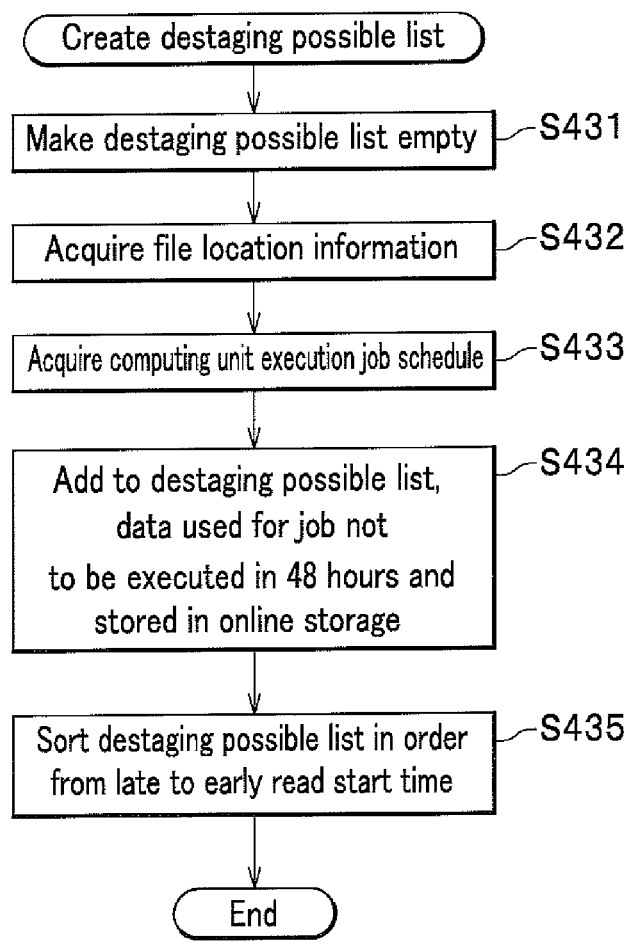
FIG. 4D is a program flow of preparing a destaging possible list.

Next is described a flow of a processing of creating the destaging possible list 211 conducted by the storage management server 180 and based on the migration control program 207, with reference to FIG. 4D.

In Step S431, the storage management server 180 initializes the destaging possible list 211 to empty the same (Step S431).

In Step S432, the storage management server 180 acquires the file location information 205 based on the file location information acquisition program 203.

In Step S433, the storage management server 180 acquires the computing unit execution job schedule 202 based on computing unit information acquisition program 201.

In Step S434, the storage management server 180 selects a job not to be executed in 48 hours or a job not to be executed any more, from the computing unit execution job schedule 202.

A time period of "48 hours" in this case is a reference time for conducting a destaging and is hereinafter referred to as a destaging reference time. The storage management server 180 retrieves a location of an output file corresponding to the selected job from the file location information 205. If the location of the output file is in the online storage 140, the storage management server 180 adds the job to the destaging possible list 211.

When the storage management server 180 adds the job to the destaging possible list 211, the storage management server 180 writes the output file 317 of the job selected from the computing unit execution job schedule 202 (see FIG. 8), the job start time 313 thereof, the stored location 322 of a file name corresponding to the output file name 317 from the file location information 205 (see FIG. 9), and the file size thereof, into the file name 381 in the destaging possible list 211 (see FIG. 15), the read start time 384 therein, the stored location 382 therein, and the file size 383 therein, respectively.

The destaging reference time is herein 48 hours, but may be changed according to how the computing unit 100 is used. For example, if an entire capacity of the online storage 140 is relatively small, it is necessary to destage a file in the online storage 140 to the nearline storage 160 whenever possible to create a larger free space in the online storage 140. In this case, the destaging reference time may be set at a short time period, for example, 24 hours, to thereby increase the number of possible candidate files for a destaging. Even so, a relation of "[Staging reference time]<[Destaging reference time]" is needed to be satisfied.

In Step S435, the storage management server 180 sorts the destaging possible list 211 in an order from late to early read start time 374. The destaging possible list 211 may be sorted in any other order such as a file size and a priority specified or set by a user.

Next is described a flow of a processing of determining whether or not there is a free space left in the online storage 140. The processing is conducted by the storage management server 180 and is based on the migration control program 207, which corresponds to Step S401 in FIG. 4A, with reference to FIG. 4F.

In Step S451, the storage management server 180 acquires the file location information 205 based on the file location information acquisition program 203.

In Step S452, the storage management server 180 acquires the computing unit execution job schedule 202 based on the computing unit information acquisition program 201.

In Step S453, the storage management server 180 creates the staging schedule 213 based on the acquired file location information 205 and the computing unit execution job schedule 202. The staging schedule 213 is a schedule of a staging from the storage system to the computing unit 100.

More specifically, the storage management server 180 writes for each order 311 of the computing unit execution job schedule 202 (see FIG. 8), the order 311, the input file name 316, and the job start time 313, into the order 331, the input file 332, and the read start time 336 in the staging schedule 213 (see FIG. 10). The storage management server 180 then retrieves the stored location 322 and the file size 323 corresponding to the input file name for the each order 331 in the staging schedule 213, based on the file location information 205 (see FIG. 9). The storage management server 180 writes the retrieved stored location 322 and the file size 323 into the location 334 and the file size 333 in the staging schedule 213 (see FIG. 10), respectively.

The throughput 335 in the staging schedule 213 (see FIG. 10) is a throughput of a file migrated from the location 334 to the computing unit 100. In FIG. 10, if the location 334 of the file is in the nearline storage 160, the throughput 335 is 1.7 GB/s, and, if the location 334 of the file is in the online storage 140, the throughput 335 is 3.4 GB/s.

The read end time 337 in the staging schedule 213 (see FIG. 10) is calculated by "[Read start time 336]+[File size 333]÷[Throughput 335]".

In Step S453, the storage management server 180 creates the destaging schedule 212 based on the acquired file location information 205 (see FIG. 9) and the computing unit execution job schedule 202 (see FIG. 8). The destaging schedule 212 is a schedule of a destaging from the computing unit 100 to the storage system.

More specifically, the storage management server 180 writes, for each order 311 of the computing unit execution job schedule 202 (see FIG. 8), the order 311, the input file name 316, and the job end time 314, into the order 341, the output file 342, and the read end time 347, respectively, in the destaging schedule 214 (see FIG. 11). The storage management server 180 then retrieves the file size 323 corresponding to the output file name for the each order 331 in the destaging schedule 212, based on the file location information 205 (see FIG. 9). The storage management server 180 writes the retrieved file size 323 into the file size 343 in the destaging schedule 212 (see FIG. 11).

The throughput 345 in the destaging schedule 212 (see FIG. 11) is a throughput of a file migrated from the location 344 to the computing unit 100. In FIG. 11, if the location 344 of the file is in the nearline storage 160, the throughput 345 is 1.7 GB/s, and, if the location 344 of the file is in the online storage 140, the throughput 345 is 3.4 GB/s.

The read start time 346 in the destaging schedule 212 (see FIG. 11) is calculated by "Read end time 347−File size 343÷Throughput 345".

A file size of an output file of a job is estimated in the embodiment. The file size may be estimated by assuming that the file size of an output file is similar to that of its input file, by assuming that the file size of an output file increases in direct proportion to a computing time of the job, by taking statistics such as an average value of file sizes of output files so far, or by obtaining information on a file size from a user.

An amount of a data to be stored in the online storage 140, that is, an increment is calculated. The increment is calculated as follows. [Increment at time t]=[Amount of data outputted from the computing unit 100 by time t]−[Amount of data destaged when a destaging to the nearline storage 160 is continued until time t]. In FIG. 5A, for example, an accumulated increment totaling the increment at each time and a used amount of the online storage 140 is shown by the polygonal line 515.

[Amount of data outputted from the computing unit 100 by time t] is calculated by totaling the file size 343 (see FIG. 11) for each schedule satisfying [Write start time 346 of the destaging schedule 340]<[Time t].

[Amount of data destaged when a destaging to the nearline storage 160 is continued until time t] is calculated by Expression 5 as follows:

[Amount of data destaged when a destaging to the
 nearline storage 160 is continued until time t]=
 [Throughput between online storage 140 and
 nearline storage 160]×([Time T]−[Current time]−
 [Time T]−[Time required for a staging]−[Time
 required for a destaging]         (Expression 5).

In FIG. 5, for example, when the time t is at time t4, the online storage 140 has the "[Time required for a staging]+[Time required for a destaging]" indicated by the total time 507. The time required for a staging is calculated by accumulating "[Read end time 337]−[Read start time 336]", that is, a read time, for each staging schedule 213 (see FIG. 10) which satisfies [Read start time 336]<[Time t].

A time required for a staging is calculated by accumulating [Read start time 336 of destaging schedule 212 (see FIG. 10) for each destaging schedule 212 which satisfies [Read end time 337]−[Read start time 336].

A time required for a destaging is calculated by accumulating [Read end time 347 of destaging schedule 212 (see FIG. 11) for each destaging schedule 212 which satisfies [Read end time 347]−[Read start time 346].

A maximum value of an increment for each time t is then calculated. A time at which an increment takes a maximum value is referred to as TMAX. In FIG. 5, for example, the time t4 is the time TMAX.

The increment is calculated by [Amount of data outputted from the computing unit 100 by the time TMAX]−[Current free space].

The increment is used for calculating an available space. That is, "[Available space]=([Free space in online storage 140−[Increment])÷2" (Step S454 in FIG. 4F).

Figure 4F:
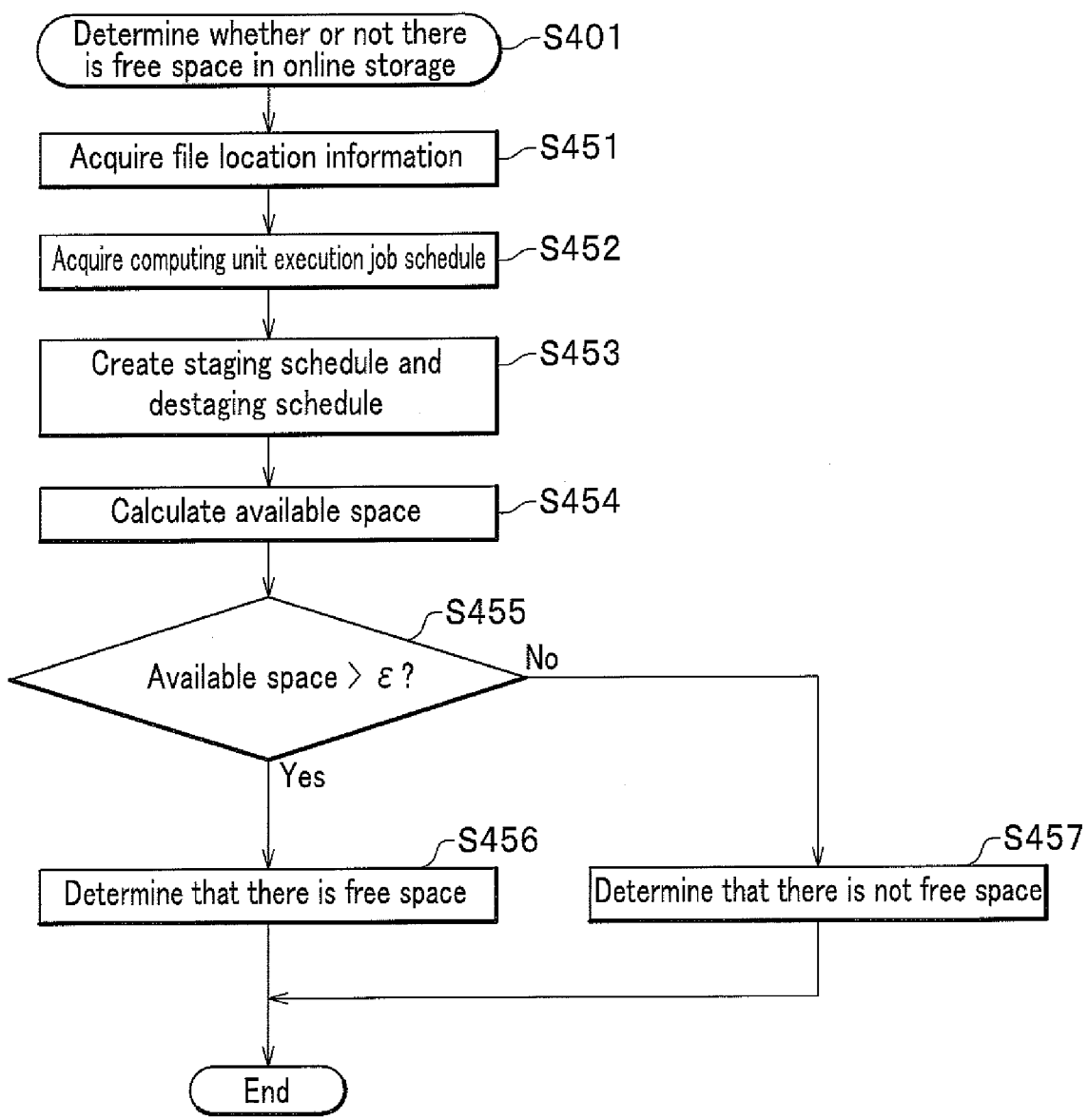
FIG. 4F is a program flow of determining whether or not there is a sufficient free space in an online storage.

The storage management server 180 determines whether or not "[Available space]>ϵ (Expression 2)" (Step S455 in FIG. 4F).

If Expression 2 is satisfied (Yes in Step S455), the storage management server 180 determines that there is a free space left in the online storage 140 (Step S456).

If Expression 2 is not satisfied (No in Step S455), the storage management server 180 determines that there is not a free space left therein (Step S457).

In the embodiment, a free space left in the online storage 140 is controlled to prevent a shortage thereof, that is, "[Available space]>0". Thus, in Step S455, there is a margin of "ϵ".

Figure 4G:
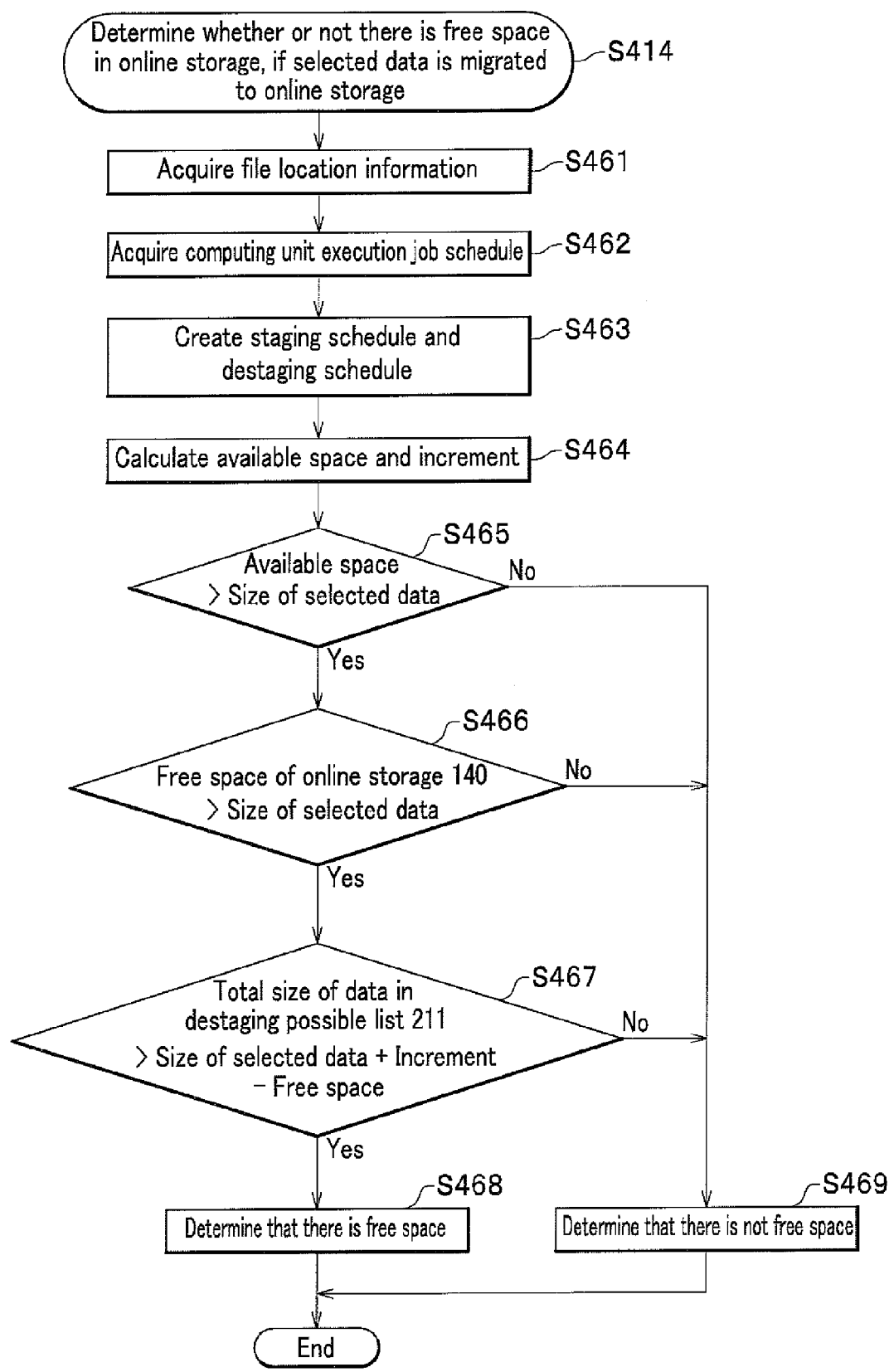
FIG. 4G is a program flow of determining whether or not there is a sufficient free space in the online storage if a selected data is migrated to the online storage.

Next is described a flow of a processing of determining a free space left in the online storage 140 conducted by the storage management server 180 when a data selected based on the migration control program 207 is migrated to the online storage 140, with reference to FIG. 4G.

In Step S461, as in Step S451, the storage management server 180 acquires the file location information 205.

In Step S462, as in Step S452, the storage management server 180 acquires the computing unit execution job schedule 202.

In Step S463, as in Step S453, the storage management server 180 creates the staging schedule 213 and the destaging schedule 212. In Step S464, as in Step S454, the storage management server 180 calculates an available space and an increment in the online storage 140.

In Step S465, the storage management server 180 determines whether or not "[Available space]>[Size of the selected data] (Expression 3)".

If Expression 3 is not satisfied (No in Step S465), the storage management server 180 determines that there is not a sufficient free space left in the online storage 140 (Step S469).

If Expression 3 is satisfied (Yes in Step S465), the storage management server 180 determines that the available space in the online storage 140 is not zero or less even after a migration of the selected data (Step S456). In this case, in Step S466, the storage management server 180 determines whether or not "[Free space of online storage 140]>[Size of selected data] (Expression 4)".

If Expression 4 is not satisfied (No in Step S466), the storage management server 180 determines that there is not a free space left in the online storage 140 (Step S469).

If Expression 4 is satisfied (Yes in Step S466), the storage management server 180 determines that the available space in the online storage 140 is sufficient for storing the selected data. In this case, the storage management server 180 determines whether or not "[Total size of data in the destaging possible list 211 ((see FIG. 15)]>[Size of selected data+Increment−Free space] (Expression 5)" (Step S467).

If Expression 5 is not satisfied (No in Step S467), the storage management server 180 determines that there is not a sufficient free space left in the online storage 140 (Step S469).

If Expression 5 is satisfied (Yes in Step S467), the storage management server 180 determines that an amount of data to be destaged has already been counted as a possible candidate in the destaging possible list 211, and that there is a sufficient free space left (Step S468).

Next is described a flow of a processing of acquiring the file location information 205 conducted by the storage management server 180, based on the migration control program (Step S432 in FIG. 4D, Step S442 in FIG. 4E, Step S451 in FIG. 4F, and Step S461 in FIG. 4G), with reference to FIG. 4H.

In Step S471, the storage management server 180 acquires information corresponding to the LU Number and storage name from the online storage 140 and the nearline storage 160 and stores the acquired information as the storage information 204 (see FIG. 13).

In Step S472, the storage management server 180 acquires the file information 122 (see FIG. 2) from the NAS head 120. The acquired file information 122 identifies the LU Number and the file size for each file.

In Step S473, the storage management server 180 creates the file location information 205 (see FIG. 9) by rewriting the LU Number as a storage name corresponding thereto to make the storage name a stored location, based on the storage information 204 (see FIG. 13).

Next are described a staging to the computing unit 100 and a destaging from the computing unit 100.

In a staging to the computing unit 100, when the NAS head 120 receives a request of reading a file from the computing unit 100, the NAS head 120 accesses a LU in which the requested file is stored and migrates the file to the computing unit 100.

In a destaging from the computing unit 100, when the NAS head 120 receives a request of writing a file from the computing unit 100, the NAS head 120 writes the requested file in the online storage 140. If "Available space<0" in this case, the NAS head 120 writes the requested file in the nearline storage 160 via the online storage 140.

In a staging and a destaging of a file to and from the computing unit 100, a throughput may be decreased, if the file is migrated from the computing unit 100 to the nearline storage 160 in a configuration of the storage system shown in FIG. 1. This is because the file is first transferred to the online storage 140 and then to the nearline storage 160. However, in a configuration of a storage system shown in FIG. 17, a direct access from the computing unit 100 to the nearline storage 160 is made without passing through the online storage 140.

Figure 17:
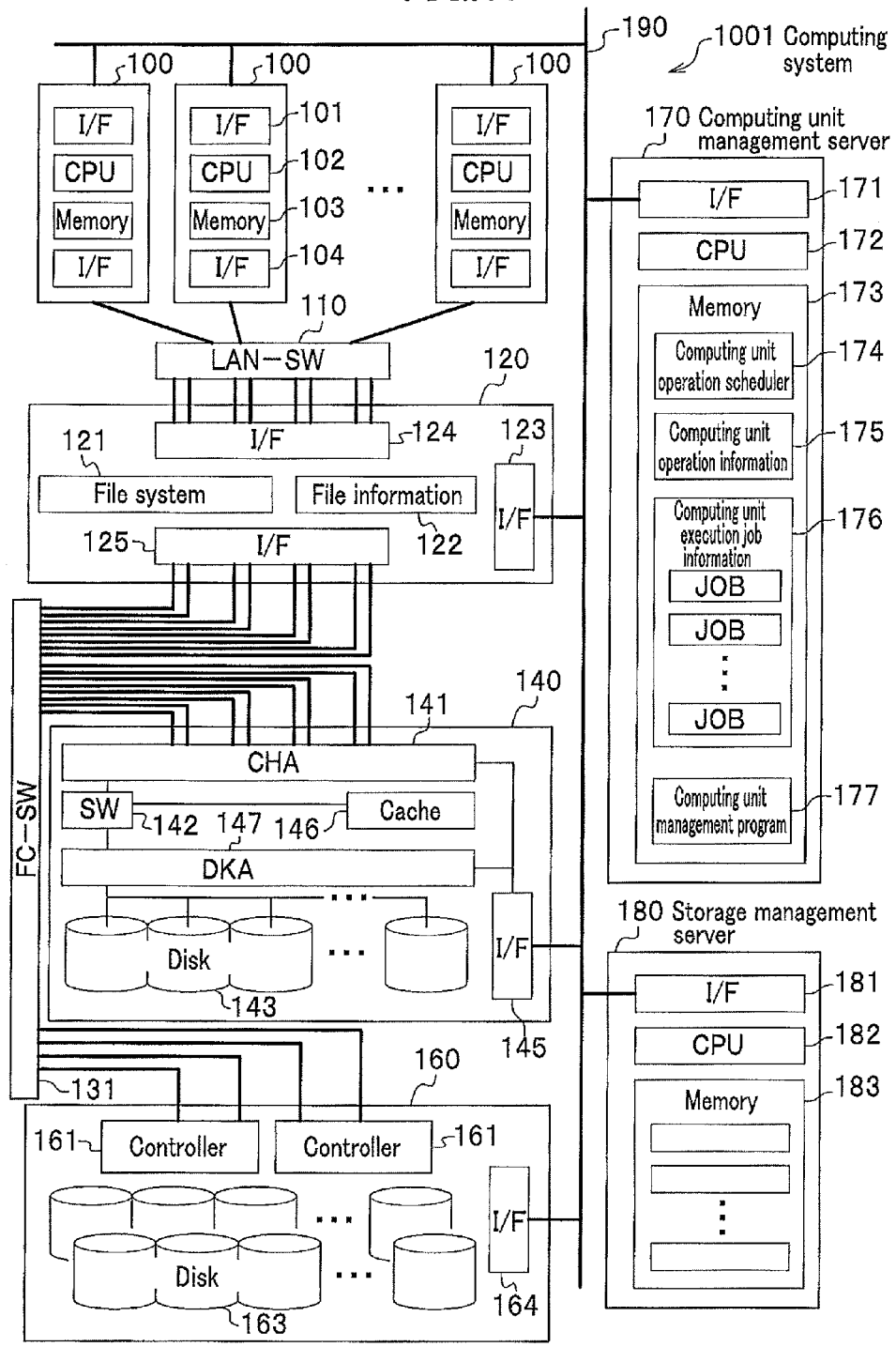
FIG. 17 a view showing an example of a configuration of a storage system in which a computing unit and a nearline storage are connected via a FC-SW according to the embodiment.

FIG. 17 a view showing a configuration of a computing system in which the computing unit 100, the online storage 140, and the nearline storage 160 are connected one another via the FC-SW 131. A computing system 1001 in FIG. 17 is different from the computing system 1000 in FIG. 1 in that the computing unit 100, the online storage 140, and the nearline storage 160 are connected one another via the FC-SW 131, and that the FC-SW 150 is omitted therefrom. The computing unit 100 can directly access both the online storage 140 and the nearline storage 160 via the FC-SW 131.

A method of the direct access described above in FIG. 17 is controlled such that a staging to the computing unit 100 or a destaging therefrom is not executed concurrently with a staging or a destaging between the online storage 140 and the nearline storage 160 by the storage management server 180. This is because the staging to the computing unit 100 or the destaging therefrom, which is a primary purpose in the present invention, should be executed as high-speed as possible. In other words, the method is controlled such that the staging or destaging between the online storage 140 and the nearline storage 160 by the storage management server 180 prevents a throughput of the staging to the computing unit 100 or the destaging therefrom from decreasing. Even so, if the two processings concurrently access a same drive in the disk 143, the throughput is decreased, though it is a limited case.

Herein is described a method of allowing such two concurrent processings. This method is different from the aforementioned method, which does not allow the two concurrent processings, in how to calculate an available space, a step of creating the staging schedule 213 (see FIG. 10) (Step S453 in FIG. 4F, a step of a staging (Step S415 in FIG. 4B), and a step of a destaging (Step S424 in FIG. 4C).

In the method, an available space is calculated with a modified Expression 5 of "[Amount of data destaged when a destaging to the nearline storage 160 is continued until time t]=[Throughput between online storage 140 and nearline storage 160]×[Time T−Current time]".

As for the step of creating the staging schedule 213, a throughput is set at a value lower than 1.7 GB/s. This is because, in the aforementioned Step S453 (see FIG. 4F), a throughput in a case in which a file is located in the nearline storage 160 is 1.7 GB/s, which is to be decreased due to the concurrent processings. A throughput may be set by measuring a decrease in throughput and determining the throughput statistically, by estimating a worst throughput, or the like.

As for the step of a staging and the step of a destaging, these steps are not suspended even during the concurrent processings. By contrast, in Step S415 (see FIG. 4B) and Step S424 (see FIG. 4C), a staging or a destaging is suspended during the concurrent processings.

Figure 16A:
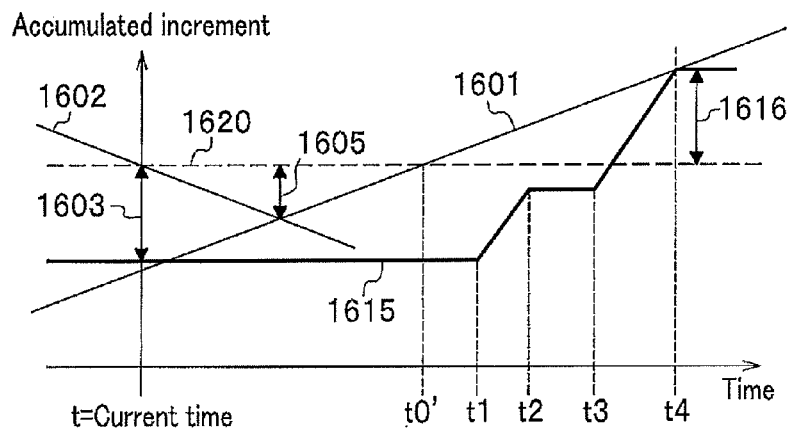
FIG. 16A to FIG. 16C are views showing operations if concurrent processings are allowed, in a method according to the embodiment.
Figure 16B:
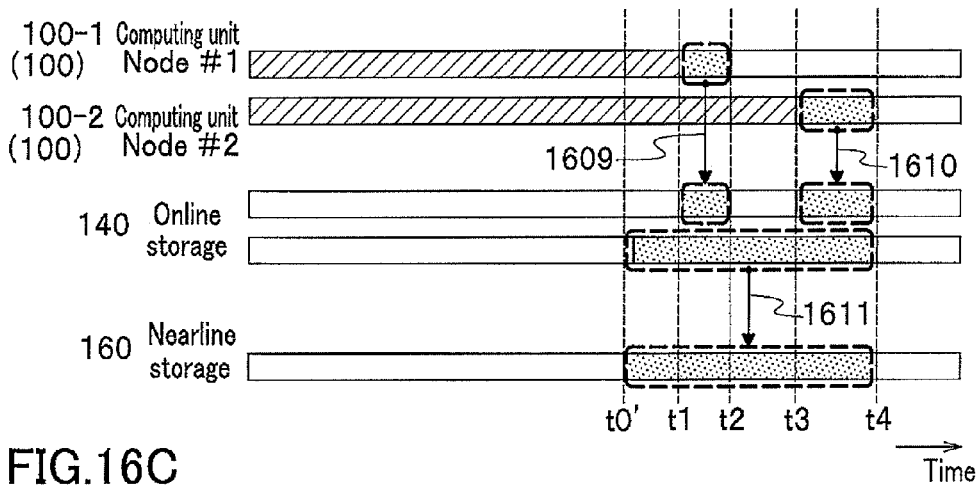
Figure 16C:
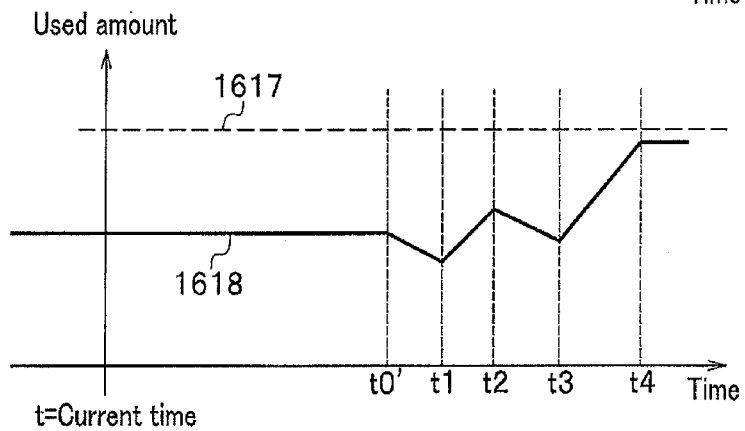

FIG. 16A to FIG. 16C are views showing operations of the method in which the concurrent processings are allowed. A duplicate description to FIG. 5 is omitted herefrom.

In FIG. 16A, a polygonal line 1615 indicates an accumulated increment calculated by adding a data to be outputted from the computing unit 100 and stored in the online storage 140, to a current used space in the online storage 140. A reference numeral 1603 indicates a current free space in the online storage 140. A dashed line 1620 indicates a maximum space of the online storage 140. The computing unit 100-1 conducts a computation of a job from a current time to the time t1.

In FIG. 16B, a destaging 1609 of an output data is started at the time t1 and is ended at the time t2. After that, the computing unit 100-2 executes a computation of a job until the time t3. At the time t3, a destaging 1610 of the output data is started from the computing unit 100-2 and is ended at a time t4.

The destaging of the output data causes an excess of the accumulated increment in the online storage 140 over its maximum space. The excess is referred to as an excess used space 1616.

A solid line 1601 in FIG. 16A has a slope corresponding to a throughput between the nearline storage 160 and the online storage 140. The solid line 1601 passes through a point on the polygonal line 1615 at the time t4.

A solid line 1602 has a negative slope corresponding to the throughput between the nearline storage 160 and the online storage 140 and passes through an origin (a point on a dashed line 1620 at a current time). A distance between an intersection between the solid lines 1601,1602 and the dashed line 1620, which indicates the maximum space of the online storage 140, indicates an available space 1605. The available space 1605 is determined whether or not to satisfy "[Available space 1605]>0 (Expression 1)".

If Expression 1 is satisfied, the free space still remains in the online storage 140, and a staging can be conducted.

If Expression 1 is not satisfied, the free space is not left in the online storage 140. In this case, a destaging is conducted from the online storage 140 to the nearline storage 160 to create a sufficient free space in the online storage 140.

The solid line 1601 and the dashed line 1620 intersect at a time t0' at which the available space 1605 is null. As shown in FIG. 16B, a destaging 1611 from the online storage 140 to the nearline storage 160 is started from the time t0' and is ended at the time t4.

In FIG. 16C, a dashed line 1617 indicates the maximum space of the online storage 140. The destaging 1609 of the output data from the computing unit 100-1 is conducted from the time t1 to the time t2. Also, a destaging 1610 of the data outputted from the computing unit 100-2 to the online storage 140 is continued because the concurrent processings are allowed. In FIG. 16C, a polygonal line 1618 indicates a used space in the online storage 140. The polygonal line 1618 represents that, since the concurrent processings are allowed, the used space in the online storage 140 is kept within the maximum space even when the data outputted from the computing unit 100 is received.

Whether or not the concurrent processings are allowed makes a difference as follows. If the concurrent processings are not allowed, a free space in the online storage 140 is controlled, and a shortage thereof is not likely to occur. However, there is a restriction that two or more data are not migrated concurrently. On the other hand, if the concurrent processings are allowed, the free space in the online storage 140 may not be always controlled, because the concurrent processings of two or more data have influence on each other's data. However, a migration can be conducted with more flexibility.

Next is described how to determine whether or not the concurrent processings are allowed.

The storage system can automatically determine whether or not the concurrent processings are allowed by setting therein a policy such as bringing down a possibility of a shortage of the free space as low as possible, or prioritizing a flexible migration because the concurrent processings is expected to cause only a small decrease in throughput.

Alternatively, a user may determine whether or not the concurrent processings are allowed.

The embodiment according to the present invention has been explained as aforementioned. However, the embodiment of the present invention is not limited to the explanation, and those skilled in the art ascertain the essential characteristics of the present invention and can make the various modifications and variations to the present invention to adapt it to various usages and conditions without departing from the spirit and scope of the claims.

For example, the NAS head is herein used for handling a data on a file basis. However, the NAS head is not indispensable in the present invention and may be substituted by other unit.

The invention claimed is:

1. A computing system, comprising:
a plurality of computing units;
a tiered storage unit connected to the plurality of computing units, the tiered storage unit comprising a first storage medium and a second storage medium having a transfer rate lower than a transfer rate of the first storage medium;
a first system management unit having a computing unit management server connected to the plurality of computing units and the tiered storage unit; and
a second system management unit having a storage management server connected to the plurality of computing units and the tiered storage unit, the second system management unit having usage information which is indicative of a usage of the first storage medium;
wherein the second system management unit is configured:
to obtain computing unit execution job information which includes contents executed by a job and computing unit operation information which includes an execution schedule of a job executed in the plurality of computing units, from the first system management unit,
to create file location information including at least information on file size, and
create a computing unit execution job schedule including a job name, a job start time, a job end time, a computing node identifier, an input file name, and an output file name, based on the computing unit execution job information and the computing unit operation information,
wherein the second system management unit is further configured:
to calculate an amount of output data to be outputted by the plurality of computing units in a first period between a current time and a first reference time for conducting a destaging from the first storage medium to the second storage medium, the output data including data from a job not to be executed before the first reference time or a job not to be executed any more, to create usage estimate information which is stored in the second system management unit and which is indicative of a prediction of available space in the first storage medium, based on the computing unit execution job schedule, the file location information and the usage information,
to select data to be migrated between the first storage medium and the second storage medium and determine a schedule for migrating the selected data according to the file location information and the computing unit execution job schedule, and to instruct the tiered storage unit to migrate the selected data based on the schedule, in accordance with the usage estimate information,
to migrate data selected from the second storage medium to the first storage medium, based on the schedule, and to migrate to the first storage medium data which is to be read by a computing unit of the plurality of computing units, before the migrated data is read, and
if there is insufficient available space in the first storage medium to store the calculated amount of the output data, to free up space in the first storage medium according to the calculated amount of the output data by migrating data from the first storage medium to the second storage medium;
wherein a second period, between a current time and second reference time for conducting a staging to migrate data from the second storage medium to the first storage medium, is shorter than the first period for conducting the destaging, and
the data to be migrated from the second storage medium to the first storage medium in the second period includes data on a job to be executed before the second reference time.

2. The computing system according to claim 1, wherein the second system management unit is configured to collect possible candidate data in the second storage medium to be migrated to the first storage medium with a predetermined method, and select data to be migrated out of the possible candidate data using a priority of a data amount or a transfer rate.

3. The computing system according to claim 1, wherein the second system management unit is configured to collect possible candidate data in the first storage medium to be migrated to the second storage medium with a predetermined method, and select data to be migrated out of the possible candidate data using a priority of a data amount or a transfer rate.

4. The computing system according to claim 1, wherein the second system management unit is configured to have information on a transfer rate between the computing unit and the first storage medium and information on a transfer rate between the first storage medium and the second storage medium, and to plan the data migration from the second storage medium to the first storage medium based on the schedule and the data migration from the first storage medium to the second storage medium to free up space in the first storage medium based on the information on the two transfer rates.

5. The computing system according to claim 4, wherein the second system management unit has information on whether each of the data stored in the tiered storage unit is stored in the first storage medium or in the second storage medium.

6. The computing system according to claim 1, wherein the second system management unit is configured to create a read schedule of data to be read and a write schedule of data to be written from a computing unit to the tiered storage unit by estimating the read schedule and the write schedule based on the computing unit execution job schedule.

7. The computing system according to claim 6, wherein the second system management unit is configured to estimate a used space in the first storage medium at each time based on the write schedule of data to be written from the computing unit to the tiered storage unit.

8. The computing system according to claim 7, wherein the second system management unit is configured to calculate an amount of an output data from the computing unit within a predetermined time period in advance, and free up space in the first storage medium by migrating data in the first storage medium to the second storage medium in advance, based on the estimated used space in the first storage medium at the each time.

9. The computing system according to claim 6, wherein the second system management unit is configured to migrate data not listed in the read schedule within a predetermined time period, from the first storage medium to the second storage medium.

10. The computing system according to claim 6, wherein the second system management unit is configured to migrate data listed in the read schedule within a predetermined time period, from the second storage medium to the first storage medium.

11. The computing system according to claim 1, wherein the second system management unit is configured to suspend or not to plan in advance a data migration in the tiered storage unit, during an access of the computing unit to the tiered storage unit, so as not to narrow a band for the access.

12. The computing system according to claim 1, wherein a timing at which the second system management unit frees up space in the first storage medium is at a time when destaging of an output data from the computing unit is ended, and available space in the first storage medium is null.

13. A method of controlling a computing system, the computing system comprising,
a plurality of computing units;
a tiered storage unit connected to the plurality of computing units, the tiered storage unit comprising a first storage medium, and a second storage medium having a transfer rate lower than a transfer rate of the first storage medium;
a first system management unit having a computing unit management server connected to the plurality of computing units and the tiered storage unit; and
a second system management unit having a storage management server connected to the plurality of computing units and the tiered storage unit, the second system management unit having usage information which is indicative of a usage of the first storage medium;
the method comprising the steps of:
by the second system management unit:
obtaining computing unit executing job information which includes contents executed by a job and computing unit operation information which includes an execution schedule of a job executed in the plurality of computing units, from the first system management unit,
creating file location information including at least information on a file size, and
creating a computing unit execution job schedule including a job name, a job start time, a job end time, a computing node identifier, an input file name, and an output file name, based on the computing unit execution job information and the computing unit operation information;
calculating an amount of output data to be outputted by the plurality of computing units in a first period between a current time and a first reference time for conducting a destaging from the first storage medium to the second storage medium, the output data including data from a job not to be executed before the first reference time or a job not to be executed any more, creating usage estimate information which is stored in the second system management unit and which indicates a prediction of available space in the first storage medium, based on the computing unit execution job schedule, the file location information and the usage information;

selecting data to be migrated between the first storage medium and the second storage medium and determining a schedule for migrating the selected data according to the file location information and the computing unit execution job schedule, in accordance with the usage estimate information;

instructing the tiered storage unit to migrate the selected data based on the schedule;

migrating data selected from the second storage medium to the first storage medium, based on the schedule;

migrating to the first storage medium data which is to be read by a computing unit of the plurality of computing units before the migrated data is read, the first storage medium having a transfer rate higher than the transfer rate of the second storage medium; and if there is insufficient available space in the first storage medium to store the calculated amount of the output data, freeing up space in the first storage medium according to the calculated amount of the output data by migrating data from the first storage medium to the second storage medium;

wherein a second period, between a current time and second reference time for conducting a staging to migrate data from the second storage medium to the first storage medium, is shorter than the first period for conducting the destaging, and the data to be migrated from the second storage medium to the first storage medium in the second period includes data on a job to be executed before the second reference time.

14. The method of controlling a computing system according to claim 13, further comprising the step of suspending or not planning in advance a data migration in the tiered storage unit during an access of the computing unit of the plurality of computing units to the tiered storage unit, so as not to narrow a band for the access.

15. A hardware system management unit in a computing system, the computing system comprising:

a plurality of computing units; a tiered storage unit connected to the plurality of computing units, the tiered storage unit comprising a first storage medium, and a second storage medium having a transfer rate lower than a transfer rate of the first storage medium;

and the hardware system management unit connected to the plurality of computing units and the tiered storage unit, the hardware system management unit comprising:

a first system management unit having a computing unit management server connected to the plurality of computing units and the tiered storage unit; and a second system management unit having a storage management server connected to the plurality of computing units and the tiered storage unit, the second system management unit having usage information which is indicative of a usage of the first storage medium;

wherein the second system management unit is configured:

to obtain computing unit execution job information which includes contents executed by a job and computing unit operation information which includes an execution schedule of a job executed in the plurality of computing units, from the first system management unit, to create file location information including at least information on file size, and to create a computing unit execution job schedule including a job name, a job start time, a job end time, a computing node identifier, an input file name, and an output file name, based on the computing unit execution job information and the computing unit operation information, wherein the second system management unit is further configured:

to calculate an amount of output data to be outputted by the plurality of computing units in a first period between a current time and a first reference time for conducting a destaging from the first storage medium to the second storage medium, the output data including data from a job not to be executed before the first reference time or a job not to be executed any more, to create usage estimate information which is stored in the second system management unit and which is indicative of a prediction of available space in the first storage medium, based on the computing unit execution job schedule, the file location information and the usage information, to select data to be migrated between the first storage medium and the second storage medium and determine a schedule for migrating the selected data according to the file location information and the computing unit execution job schedule, and to instruct the tiered storage unit to migrate the selected data based on the schedule, in accordance with the usage estimate information, to migrate data selected from the second storage medium to the first storage medium, based on the schedule, and to migrate to the first storage medium data which is to be read by a computing unit of the plurality of computing units, before the migrated data is read, and if there is insufficient available space in the first storage medium to store the calculated amount of the output data, to free up space in the first storage medium according to the calculated amount of the output data by migrating data from the first storage medium to the second storage medium;

wherein a second period, between a current time and second reference time for conducting a staging to migrate data from the second storage medium to the first storage medium, is shorter than the first period for conducting the destaging, and the data to be migrated from the second storage medium to the first storage medium in the second period includes data on a job to be executed before the second reference time.

* * * * *